(12) United States Patent
Liu et al.

(10) Patent No.: US 11,688,019 B2
(45) Date of Patent: Jun. 27, 2023

(54) METHOD FOR ASSESSING COMPREHENSIVE RISK OF DROUGHT AND FLOOD DISASTER ON APPLES

(71) Applicant: INSTITUTE OF ENVIRONMENT AND SUSTAINABLE DEVELOPMENT IN AGRICULTURE, CAAS, Beijing (CN)

(72) Inventors: Buchun Liu, Beijing (CN); Meijuan Qiu, Beijing (CN); Yuan Liu, Beijing (CN)

(73) Assignee: INSTITUTE OF ENVIRONMENT AND SUSTAINABLE DEVELOPMENT IN AGRICULTURE, CAAS, Beijing (CN)

( * ) Notice: Subject to any disclaimer, the term of this patent is extended or adjusted under 35 U.S.C. 154(b) by 0 days.

(21) Appl. No.: 17/822,425

(22) Filed: Aug. 25, 2022

(65) Prior Publication Data
US 2023/0080168 A1 Mar. 16, 2023

(30) Foreign Application Priority Data
Aug. 27, 2021 (CN) .......................... 202110996391.7

(51) Int. Cl.
*G06Q 40/08* (2012.01)
(52) U.S. Cl.
CPC .................... *G06Q 40/08* (2013.01)
(58) Field of Classification Search
CPC ....................................................... G06Q 40/08
See application file for complete search history.

(56) References Cited

U.S. PATENT DOCUMENTS

2021/0233179 A1* 7/2021 Zhang .................... G06Q 50/02

FOREIGN PATENT DOCUMENTS

| CN | 105184445 A | 12/2015 |
|---|---|---|
| CN | 108876084 A | 11/2018 |

(Continued)

OTHER PUBLICATIONS

First Office Action in Chinese Application No. 202110996391.7 dated Mar. 24, 2022, 10 pages.
(Continued)

*Primary Examiner* — Edward Chang
(74) *Attorney, Agent, or Firm* — Metis IP LLC

(57) ABSTRACT

The present provides methods for assessing comprehensive risk of drought and flood disasters on apple. The method adopts an optimal curve relationship between an apple yield reduction rate and drought and flood indexes and considers two disasters of drought and flood at the same time to determine the weather index threshold value under the threshold values of different yield reduction rates, meanwhile, builds comprehensive risk index models of drought and flood disasters from risk of disaster-causing factor, sensitivity of disaster-pregnant environment, vulnerability of disaster-bearing body, etc. using terrain, rivers, vegetation, apple planting area, and water profit and loss ratio, etc., and determine a premium rate according to a level of disaster risk to obtain insurance rates and premiums in different regions according to local conditions, thereby formulating a design scheme of insurance products suitable for local conditions, which has great advantages compared with a traditional single-disaster weather index insurance.

10 Claims, 9 Drawing Sheets

(56) References Cited

FOREIGN PATENT DOCUMENTS

| | | |
|---|---|---|
| CN | 108898499 A | 11/2018 |
| CN | 109657981 A | 4/2019 |

OTHER PUBLICATIONS

Decision to Grant a Patent in Chinese Application No. 202110996391.7 dated May 27, 2022, 3 pages.

* cited by examiner

METHOD FOR ASSESSING COMPREHENSIVE RISK OF DROUGHT AND FLOOD DISASTER ON APPLES

CROSS-REFERENCE TO RELATED APPLICATIONS

This application claims priority of Chinese Patent Application No. 202110996391.7, filed on Aug. 27, 2021, the entire contents of which are hereby incorporated by reference.

TECHNICAL FIELD

The present disclosure relates the field of crop weather disaster risk assessment, and in particular to methods for assessing comprehensive risk of drought and flood disasters on apples.

BACKGROUND

An apple tree, one of plants of an apple genus, is one of the fruit trees with the largest planting area and the largest yield in the world. The apple tree has a long economical service life and a strong adaptability to the soil, which may be cultivated in a general thin hilly land and a mildly saline-alkali land. The apple tree is a high-yield fruit tree. A water condition is an important factor limiting to increase of apple yield per unit and improvement of apple quality. Too much water or too little water may affect growth and development of apples, and even lead to death of fruit trees and no harvest. The apple tree may be susceptible to a drought disaster during the apple fruit expansion period, resulting in small apples, poor quality, and even fruit drop, leading to a reduced yield. At the same time, the apple fruit expansion period is mainly in summer, which may be prone to a rainstorm and a flood disaster, resulting in water accumulation in orchards and flooding of fruit tree roots, thus affecting the quality and yield of apples.

The assessment of agrometeorological disaster risk has many uses such as guiding agricultural production management, designing agricultural product insurance products, etc. An agricultural product insurance may transfer and disperse risk of agrometeorological disasters, and reduce losses through insurance when agricultural production suffers from a natural disaster such as drought, rainstorm, flood, wind disaster, hail disaster, etc. A weather index insurance is an agricultural insurance product that uses a specific weather indicator as a trigger mechanism, such as a weather event (e.g., typhoon, hail, freezing, heat wave, blizzard, El Nino, etc.), temperature, precipitation, wind speed, light, etc. As a basis for payment. If the weather indicator reaches a trigger threshold, an insurer may make payment to a policyholder, which has nothing to do with an actual damage of crops.

At present, there have been many studies on agricultural weather index insurance for different crops in different regions. Weiping Lou (2009, 2011) designed a weather index insurance product for tea frost and citrus frost damage. Taiming Yang et al. (2013, 2015, 2016) respectively designed corresponding meteorological index insurance products for drought, cold spring, hot and dry wind and continuous rain in a growth process of winter wheat in Anhui Province, a high temperature and heat damage during a growth of rice in Anhui Province, a drought disaster during a growth period of summer maize in Anhui Province, etc. Yan Song (2017) designed a weather index insurance for corn in Liaoning Province. Shang Yang (2019) designed a peanut weather index insurance product for drought and flood disasters during peanut planting in Jiaodong Peninsula, Shandong Province. Yueqin Wang et al. (2019) designed a comprehensive weather index insurance product for millet in Qinxian County, Shaanxi Province by constructing a drought index and a rainstorm index and introducing a data optimization matching method. Xiaojuan Yang et al. (2020) analyzed drought disasters of local corn planting using corn yield and meteorological data in Changwu, Shanxi Province, and designed a corn precipitation index insurance using a Logistic model to determine a pure premium rate. Qisong Yuan et al. (2020) formulated a drought index and a drought grade using meteorological data, and determined a pure drought premium rate of chili peppers in Guizhou. These techniques have achieved important results. However, a research on a weather index insurance product for flood and drought disasters on apples is rarely reported. Therefore, it is desirable to provide a method for assessing comprehensive risk of drought and flood disasters on apples, which may be configured to design a weather index insurance product for drought and flood disasters on apples.

SUMMARY

One or more embodiments of the present disclosure provide methods for assessing comprehensive risk of drought and flood disasters on apples. The method may consider two disasters of drought and flood disasters to determine a weather index threshold, and determine an insurance rate of weather index insurance product for drought and flood disasters on apples according to a level of disaster risk, providing scientific guidance for apple drought and flood disaster risk prevention. The present disclosure is achieved through the following technical solutions.

The method for assessing comprehensive risk of drought and flood disasters on apples may include steps.

Step 1: carrying out trend yield simulation using historical apple yield data to calculate an apple yield reduction rate.

Step 2: calculating a water profit and loss ratio during an apple fruit expansion period using historical weather data.

Step 3: establishing an optimal relationship curve model between the apple yield reduction rate and the water profit and loss ratio.

Step 4: determining, according to the optimal relationship curve model, a weather index threshold, and calculating, based on the weather index threshold, the water profit and loss ratio under different apple yield reduction rates to obtain different drought and flood index values corresponding to the different apple yield reduction rates.

Step 5: calculating, based on an information diffusion theory, risk estimated values corresponding to the different drought and flood index values, which may refer to occurrence probabilities of the different drought and flood index values.

Step 6: calculating, according to the different apple yield reduction rates and the occurrence probabilities of the different drought and flood index values, pure premium rates and actual insurance rates under different thresholds of yield reduction rate.

Step 7: building, based on risk of a disaster-causing factor, sensitivity of a disaster-pregnant environment, and vulnerability of a disaster-bearing body, a comprehensive risk index model of drought and flood disasters using data of terrain, rivers, vegetation, apple planting area and the water profit and loss ratio, wherein the comprehensive risk index model of drought and flood disasters includes a comprehensive risk index model of drought disaster and a comprehensive risk index model of flood disaster.

Step 8: designing, according to the comprehensive risk index model of drought disaster and the comprehensive risk index model of flood disaster, a correction coefficient to correct the pure premium rate.

Step 9: calculating, according to the corrected pure premium rate, an actual insurance rate and a premium, wherein the premium is equal to a product of an insured amount and the actual insurance rate.

Step 10: designing a compensation scheme and calculating a compensation pay-outs according to the compensation scheme.

In the above technical solution, in the step 1, actual apple yield may be decomposed into apple trend yield and apple meteorological yield, $Yd=Yt+Yw$, and the apple meteorological yield may be the actual apple yield minus the apple trend yield, $Yw=Yd-Yt$, where $Yd$ denotes the actual apple yield, $Yt$ denotes the apple trend yield, $Yw$ denotes the apple meteorological yield. When $Yw>0$, it means that the apple yield increases due to the weather. When $Yw=0$, it means that the apple yield is not affected by the weather fluctuation. When $Yw<0$, it means that the apple yield is reduced due to the weather. An apple relative meteorological yield may be calculated using the actual apple yield and the apple trend yield, which may also refer to an apple yield reduction rate. $Ym=Yw/Yt\times100\%=(Yd-Yt)/Yt\times100\%=(Yd/Yt-1)\times100\%$, where $Ym$ denotes the apple yield reduction rate, which may also refer to the apple relative meteorological yield.

In the above technical solution, in the step 2, a calculation equation of the water profit and loss ratio may be $WPLR=(P-ETc)/ETc$, where $WPLR$ denotes the water profit and loss ratio, $P$ denotes precipitation (mm), $ETc$ denotes water demand (mm). $ETc=\Sigma(Kc\times ET_0)$. $Kc$ denotes a crop coefficient corrected and may be obtained using a minimum humidity method recommended by FAO56. $ET_0$ denotes a crop reference evapotranspiration calculated according to a Penman-Monteith model.

In the above-mentioned technical solution, in the step 6, a determination equation of the pure premium rate may be $R=E(loss)=\Sigma(P\times loss)$, where $R$ denotes the pure premium rate, loss denotes an apple yield loss, which may also refer to the yield reduction rate, $E(loss)$ denotes an expected value of the apple yield loss, and $P$ denotes an occurrence probability of flood and drought disasters during the apple fruit expansion period, which may be calculated through the step 5. A determination equation of the actual insurance rate may be $Ra=R\times(1+Sf)\times(1+Be)\times(1+Sr)$, where $Ra$ denotes the actual insurance rate, $Sf$ denotes a safety factor, which may be taken as 15%, $Be$ denotes business expenses, which may be taken as 20%, and $Sr$ denotes a predetermined surrate, which may be taken as 5%.

In the above-mentioned technical solution, in the step 7, the comprehensive risk index model of the drought disaster may be built by steps.

Step 7.11: determining the water profit and loss ratio as a drought disaster index, and classifying the drought disaster index of apples to obtain drought disaster index values of different grades.

Step 7.12: calculating, based on the theory of information diffusion, drought disaster occurrence probabilities corresponding to the drought disaster index values of different grades.

Step 7.13: building, according to the drought disaster occurrence probabilities corresponding to the drought disaster index values of different grades and classification of grades of the drought disaster index, a risk index model of disaster-causing factor of drought disaster on apples to determine a risk index of disaster-causing factor of drought disaster on apples, wherein a size of the risk index of disaster-causing factor of drought disaster is expressed as a sum of products of the drought disaster occurrence probabilities corresponding to the drought disaster index values of different grades and class mid values of drought disasters of different grades.

Step 7.14: building a sensitivity index model of disaster-pregnant environment of drought disaster on apples using the data of the terrain, water system information, and the vegetation data of an apple planting region to obtain a sensitivity index of disaster-pregnant environment of drought disaster on apples.

Step 7.15: building a first vulnerability index model of disaster-bearing body using an apple planting area and an agricultural acreage to carry out a disaster-bearing body vulnerability assessment of drought disaster on apples to obtain a vulnerability index of drought disaster on apples.

Step 7.16: building the comprehensive risk index model of drought disaster on apples using the risk index of disaster-causing factor of drought disaster on apples, the sensitivity index of disaster-pregnant environment of drought disaster on apples, and the vulnerability index of drought disaster on apples.

The comprehensive risk index model of flood disaster may be built by steps.

Step 7.21: determining the water profit and loss ratio as a flood disaster index, and classifying the flood disaster index of apples to obtain flood disaster index values of different grades during the apple fruit expansion period.

Step 7.22: calculating flood disaster occurrence frequencies corresponding to the flood disaster index values of different grades.

Step 7.23: building, according to the flood disaster occurrence frequencies corresponding to the flood disaster index values of different grades and classification of grades of the flood disaster index, a risk index model of disaster-causing factor of flood disaster based on the water profit and loss ratio to determine a risk index of disaster-causing factor of flood disaster based on the water profit and loss ratio, wherein a size of the risk index of disaster-causing factor is expressed as a sum of products of the flood disaster occurrence frequencies corresponding to the flood disaster index values of different grades and class mid values of the flood disasters of different grades.

Step 7.24: building a sensitivity index model of disaster-pregnant environment of flood disaster during the apple fruit expansion period using the data of the terrain, the water system information, and the vegetation of the apple planting region to carry out a disaster-pregnant environment sensitivity assessment of a flood disaster on apples to determine a sensitivity index of disaster-pregnant environment of flood disaster on apples.

Step 7.25: building a second vulnerability index model of disaster-bearing body using the apple planting area and the agricultural acreage to carry out a disaster-bearing body vulnerability assessment of a flood disaster during the apple fruit expansion period to determine a vulnerability index of flood disaster on apples.

Step 7.26: building the comprehensive risk index model of flood disaster using the risk index of disaster-causing factor of flood disaster based on the water profit and loss ratio, the sensitivity index of disaster-pregnant environment of flood disaster on apples, and the vulnerability index of flood disaster on apples.

In the above-mentioned technical solution, in the step 7.16, the comprehensive risk index model of drought disaster may be DRI=DH*WH+(1.5−DS)*WS+DV*WV, where DRI denotes a comprehensive risk index of drought disaster on apples, DH, DS, and DV respectively denote the risk index of disaster-causing factor of drought disaster on apples, the sensitivity index of disaster-pregnant environment of drought disaster on apples, and a normalized value of vulnerability index of drought disaster on apples, and WH, WS and WV denote weights.

In the above-mentioned technical solution, in the step 8, a comprehensive risk index of drought disaster and a comprehensive risk index of flood disaster may be first normalized respectively. The normalized comprehensive risk index of drought disaster and the normalized comprehensive risk index of flood disaster may be added together, and then standardized process may be performed according to an equation: correction coefficient=(index value−minimum index value)/(maximum index value−minimum index value)×0.4+0.8, and the obtained correction coefficient may fluctuate between 0.8 and 1.2 according to a level of drought and flood disaster risk. Corrected pure premium rate=correction coefficient×original pure premium rate.

The advantages and beneficial effects of the present disclosure are as follows.

The present disclosure adopts an optimal curve relationship between an apple yield reduction rate and drought and flood indexes, and considers two disasters of drought and flood at the same time to determine the weather index threshold value under the threshold values of different yield reduction rates, meanwhile, builds comprehensive risk index models of drought and flood disasters from a perspective such as risk of disaster-causing factor, sensitivity of disaster-pregnant environment, vulnerability of disaster-bearing body, etc. using terrain, rivers, vegetation, apple planting area, and the water profit and loss ratio obtained from the step 2, etc., and determines an insurance rate according to a level of disaster risk to obtain insurance rates and premiums in different regions according to local conditions, thereby formulating a design scheme of insurance products suitable for local conditions, which has great advantages and can meet design requirements of weather index insurance products compared with a traditional single-disaster weather index insurance.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
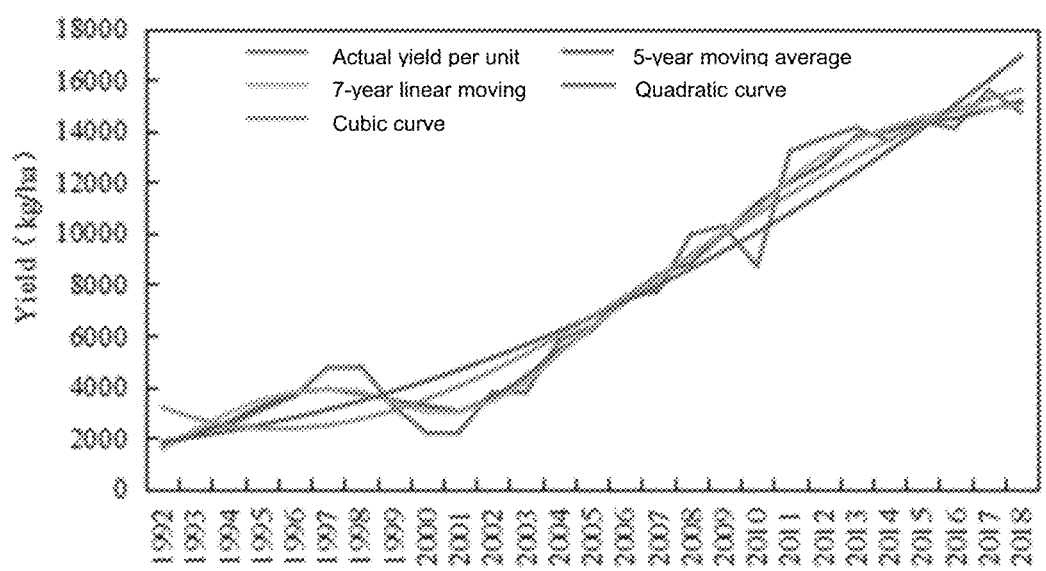
FIG. 1 is a diagram illustrating changes of an actual yield per unit and a trend yield per unit of apples in Chengde City under different yield fitting manners according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

In order to make those skilled in the art better understand the solutions of the present disclosure, the technical solutions of the present disclosure are further described below with reference to specific embodiments.

In some embodiments, a method for assessing comprehensive risk of drought and flood disasters on apples may include the following operations.

In step 1, trend yield simulation is carried out using historical apple yield data to calculate an apple yield reduction rate.

Actual apple yield may be decomposed into apple trend yield and apple meteorological yield, that is, $Yd=Yt+Yw$, and the apple meteorological yield may be the actual apple yield minus the apple trend yield, that is, $Yw=Yd-Yt$, where Yd denotes the actual apple yield, Yt denotes the apple trend yield, and Yw denotes the apple meteorological yield. When $Yw>0$, it means that the apple yield increases due to the weather. When $Yw=0$, it means that the apple yield is not affected by the weather fluctuation. When $Yw<0$, it means that the apple yield is reduced due to the weather.

In the embodiment, a 7-year linear moving average manner may be used to simulate the apple trend yield. A yield trend of an apple yield sequence in a certain period may be regarded as a straight line, and a continuous change of the yield trend may be reflected in a continuous change of a position of a trend line during a moving period. An equation of a straight line segment during each moving period may be: $yi(t)=ai+bi (i=1, 2, 3, \ldots, N-k+1)$, where i denotes a sequence number of the straight line segment, k denotes a length of each moving period, which may be generally 5, 7, 10, etc., N denotes a sample length, $k<N$, t denotes a year number. When $i=1$, $t=1, 2, \ldots, k$. When $i=2$, $t=2, 3, \ldots, k+1$ ..... When $i=n-k+1$, $t=n-k+1, n-k+2, \ldots, N$. A function value $yi(t)$ of the equation at point t of the year number during each period may be first calculated, and then an average value of qt function values at the point t may be calculated, which also refers to the trend yield. An apple relative meteorological yield may be calculated using the actual apple yield and the apple trend yield, which also refer to an apple yield reduction rate, $Ym=Yw/Yt\times100\%=(Yd-Yt)/Yt\times100\%=(Yd/Yt-1)\times100\%$, where Ym denotes the apple yield reduction rate, which also refers to the apple relative meteorological yield.

In step 2, a water profit and loss ratio during an apple fruit expansion period is calculated using historical weather data.

A calculation equation of the water profit and loss ratio may be $WPLR=(P-ETc)/ETc$, where WPLR denotes the water profit and loss ratio, P denotes precipitation (mm), and ETc denotes water demand (mm). $ETc=\Sigma(Kc\times ET_0)$, where Kc denotes a crop coefficient corrected using a minimum humidity method recommended by FAO56, and $ET_0$ denotes a crop reference evapotranspiration calculated according to a Penman-Monteith model.

In step 3, an optimal relationship curve model is established between the apple yield reduction rate and the water profit and loss ratio.

In step 4, a weather index threshold is determined according to the optimal relationship curve model. That is, it is assumed that there is an optimal water profit and loss ratio during an apple fruit expansion period and a growth period, so that the relative meteorological yield may be the highest (that is, the apple yield reduction rate may be equal to 0%). At this time, the optimal water profit and loss ratio may be defined as the weather index threshold. If the water profit and loss ratio is higher or lower than the weather index threshold, the relative meteorological yield may decrease (that is, a yield reduction rate value may increase). The water profit and loss ratio during the apple fruit expansion period under different yield reduction rates may be calculated based on the weather index threshold to obtain different drought and flood index values corresponding to the different apple yield reduction rates (the water profit and loss ratio may be defined as a flood index value when the water profit and loss ratio is positive, and the water profit and loss ratio may be defined as a drought index value when the water profit and loss ratio is negative). For example, assuming the apple reduction rate is respectively equal to −5%, −10%, and −15%, and the drought and flood index values at different yield reduction rates may be calculated.

In step 5, risk estimated values corresponding to the different drought and flood index values are calculated based on an information diffusion theory, that is, occurrence probabilities of the different drought and flood index values.

In step 6, pure premium rates and actual insurance rates under thresholds of different yield reduction rate (e.g., −5%, −10%, and −15%) are calculated according to the different apple yield reduction rates and the occurrence probabilities of the different drought and flood index values.

A determination equation of the pure premium rate is $R=E(loss)=\Sigma(P\times loss)$, where R denotes the pure premium rate, loss denotes an apple yield loss, that is, the yield reduction rate, E(loss) denotes an expected value of the apple yield loss, and P denotes an occurrence probability of flood and drought disasters during the apple fruit expansion period, which may be calculated through the step 5. A determination equation of the actual insurance rate may be $Ra=R\times(1+Sf)\times(1+Be)\times(1+Sr)$, where Ra denotes the actual insurance rate, Sf denotes a safety factor, which is taken as 15%, Be denotes business expenses, which is taken as 20%, and Sr denotes a predetermined surrate, which is taken as 5%.

In step 7, a comprehensive risk index model of drought and flood disasters is built based on risk of a disaster-causing factor, sensitivity of a disaster-pregnant environment, and vulnerability of the disaster-bearing body using data of terrain, rivers, vegetation, apple planting area, and the water profit and loss ratio obtained in the step 2. The comprehensive risk index model of drought and flood disasters may include a comprehensive risk index model of drought disaster and a comprehensive risk index model of flood disaster.

The comprehensive risk index model of drought disaster may be built by following steps.

In step 7.11, the water profit and loss ratio is determined as a drought disaster index (a negative water profit and loss ratio), and the drought disaster index of apples is classified to obtain drought disaster index values of different grades.

In the classification, combined with a national standard GB/T 32135-2015 for regional drought grade classification, an agricultural drought warning grade standard GBT 34817-2017, and a national emergency response plan for flood control and drought relief, a drought disaster situation of apples may be classified into four grades: a light drought, a moderate drought, a heavy drought, and an extreme drought based on a percentage of a crop drought-affected area to a total crop sown area (hereinafter referred to as a drought disaster rate). Specifically, when the grades are classified, a percentile manner may be used to classify the drought disaster index grades (four grades) for the water profit and loss ratio of apples. By comparing the drought grade classification based on the water profit and loss ratio of apples with the drought grade classification based on a drought disaster rate, and combined with records of drought disasters on apples in "China Meteorological Disasters Encyclopedia" and "China Meteorological Disaster Yearbook," the drought disaster index grades may be adjusted to obtain drought disaster indexes of different grades of apples.

In step 7.12, drought disaster occurrence probabilities corresponding to the drought disaster index values of different grades are calculated based on the theory of information diffusion.

In step 7.13, a risk index model of disaster-causing factor of drought disaster on apples is built according to the drought disaster occurrence probabilities corresponding to the drought disaster index values of different grades and classification of grades of the drought disaster index to determine a risk index of disaster-causing factor of drought disaster on apples. A size of the drought risk index of disaster-causing factor may be expressed as a sum of products of the drought disaster occurrence probability corresponding to the drought disaster index values of different levels and class mid values of drought disasters of different levels. For example, the risk index model of disaster-causing factor of drought disaster may be $DH=\Sigma_{i=1}^{4} P_i \times D_i$, where Pi denotes the drought disaster occurrence probability corresponding to each drought disaster index in the $i^{th}$ grade, Di denotes the class mid value of each drought disaster index value in the $i^{th}$ grade, and i=4, representing 4 grades of the light drought, the moderate drought, the heavy drought, and the extreme drought.

In step 7.14, a sensitivity index model of disaster-pregnant environment of drought disaster on apples is built using data of terrain, water system information, and vegetation of an apple planting region to obtain a sensitivity index of disaster-pregnant environment of drought disaster on apples. More descriptions regarding the sensitivity index model of disaster-pregnant environment of drought disaster may be found in FIG. 8 and relevant descriptions thereof.

In step 7.15, a first vulnerability index model of disaster-bearing body is built using the apple planting area and an agricultural acreage to carry out a disaster-bearing body vulnerability assessment of a drought disaster on apples to obtain a vulnerability index of drought disaster on apples. More descriptions regarding the first vulnerability index model of disaster-bearing body may be found in FIG. 8 and relevant descriptions thereof.

In step 7.16, the comprehensive risk index model of drought disaster on apples is built using the risk index of disaster-causing factor of drought disaster on apples, the sensitivity index of disaster-pregnant environment of drought disaster on apples, and the vulnerability index of drought disaster on apples.

The risk index of disaster-causing factor of drought disaster, the sensitivity index of disaster-pregnant environment of drought disaster, and the vulnerability index of drought disaster are respectively normalized, and weights may be assigned to the normalized indexes respectively. For example, according to an expert scoring manner, weights of 0.5, 0.3, and 0.2 may be respectively assigned to the normalized indexes to build the comprehensive risk index model of drought disaster. The comprehensive risk index model of drought disaster may be DRI=DH*WH+(1.5−DS)*WS+DV*WV, where DRI denotes a comprehensive risk index of drought disaster on apples, DH, DS, and DV respectively denote normalized values of the risk index of disaster-causing factor of drought disaster on apples, the sensitivity index of disaster-pregnant environment of drought disaster on apples, and the vulnerability index of drought disaster on apples. The normalization manner may adopt $$u_D = 0.5 + 0.5 x \frac{u - u_{min}}{u_{max} - u_{min}},$$

where $u_D$ denotes the normalized value of each index, u denotes an original value of each index, $u_{min}$ and $u_{max}$ respectively denote a minimum value and a maximum value of each index, and WH, WS, and WV respectively denote weights of each index.

The comprehensive risk index model of flood disaster may be built by the following steps.

In step 7.21: the water profit and loss ratio is determined as a flood disaster index (a positive water profit and loss ratio), and the apple flood disaster index is classified to obtain flood disaster index values of different grades during an apple fruit expansion period.

When the grades are classified, the water profit and loss ratios corresponding to different percentiles may be calculated based on the percentile manner. Through continuous iteration with ±1%, combined with a flood damage rate of apples in a target planting region and records of rainstorm and flood disasters in "China Meteorological Disasters Encyclopedia" and "China Meteorological Disaster Yearbook," according to different percentiles, the flood disaster indexes may be classified into four grades: a light flood, a moderate flood, a heavy flood, and an extreme flood, that is, the water profit and loss ratio indexes may be classified into four grades: a light flood, a moderate flood, a heavy flood, and an extreme flood.

In step 7.22, flood disaster occurrence frequencies corresponding to the flood disaster index values of different grades are calculated.

In step 7.23, a risk index model of disaster-causing factor of flood disaster based on the water profit and loss ratio to determine a risk index of disaster-causing factor of flood disaster based on the water profit and loss ratio is built according to the flood disaster occurrence frequencies corresponding to the flood disaster index values of different grades and classification of grades of the flood disaster index. A size of the risk index of disaster-causing factor may be expressed as a sum of products of the flood disaster occurrence frequencies corresponding to the flood disaster index values of different grades and class mid values of the flood disasters of different grades.

The risk index model of disaster-causing factor of flood disaster based on the water profit and loss ratio may be $DH=\Sigma_{i=1}^{4} P_i \times D_i$, where Pi denotes the flood disaster occurrence frequency corresponding to each flood disaster index in the grade, Di denotes the class mid value of each flood disaster index in the $i^{th}$ grade, and i=4, representing 4 grades of the light flood, the moderate flood, the heavy flood, and the extreme flood.

In step 7.24, a sensitivity index model of disaster-pregnant environment of flood disaster during an apple fruit expansion period is built using the data of the terrain, the water system information, and the vegetation of the apple planting region, the water system information, and the vegetation data to determine a sensitivity index of disaster-pregnant environment of flood disaster on apples. More descriptions regarding the sensitivity index model of disaster-pregnant environment of flood disaster may be found in FIG. 9 and relevant descriptions thereof.

In step 7.25, a second vulnerability index model of disaster-bearing body is built using the apple planting area and the agricultural acreage to carry out a disaster-bearing body vulnerability assessment of a flood disaster during the apple fruit expansion period to determine a vulnerability index of flood disaster on apples. More descriptions regarding the second vulnerability index model of disaster-bearing body may be found in FIG. 9 and relevant descriptions thereof.

In step 7.26, the comprehensive risk index model of flood disaster is built using the risk index of disaster-causing factor of flood disaster based on the water profit and loss ratio, the sensitivity index of disaster-pregnant environment of flood disaster on apples, and the vulnerability index of flood disaster on apples. The comprehensive risk index model of flood disaster may be DRI1=DH1*WH+(1.5−DS)*WS+DV*WV, where DRI1 denotes a comprehensive risk index of flood disaster during an apple fruit expansion period, DH1, DS, and DV respectively denote normalized values of the risk index of disaster-causing factor of flood disaster during an apple fruit expansion period, the sensitivity index of disaster-pregnant environment of flood disaster during an apple fruit expansion period, and the vulnerability index of flood disaster during an apple fruit expansion period. The normalization manner may adopt $$u_D = 0.5 + 0.5x \frac{u - u_{min}}{u_{max} - u_{min}},$$

wherein $u_D$ denotes the normalized value of each index, u denotes an original value of each index, $u_{min}$ and $u_{max}$ respectively denote a minimum value and a maximum value of each index, and WH, WS, and WV respectively denote weights of each index.

In step 8, a correction coefficient is designed according to the comprehensive risk index model of drought disaster and the comprehensive risk index model of flood disaster to correct the pure premium rate in the step 6.

A comprehensive risk index of drought disaster and a comprehensive risk index of flood disaster may be first normalized respectively. The normalized comprehensive risk index of drought disaster and the normalized comprehensive risk index of flood disaster may be added together, then standardized processing may be performed according to an equation: correction coefficient=(index value−minimum index value)/(maximum index value−minimum index value)×0.4+0.8. The obtained correction coefficient may fluctuate between 0.8 and 1.2 according to a level of drought and flood disaster risk. A corrected pure premium rate=correction coefficient×original pure premium rate.

In step 9, an actual insurance rate and a premium are calculated according to the pure premium rate of obtained in the step 8, the calculation equation is Premium=insured amount×actual insurance rate.

In step 10, a compensation scheme is designed and a compensation pay-outs is calculated according to the compensation scheme.

In some embodiments, a specific verification is made by taking a method for designing a weather index insurance product for drought and flood disasters during the apple fruit expansion period in Chengde City, Hebei Province as an example.

In the embodiment, an apple yield in Chengde City is fitted by several manners, such as a 5-year moving average manner, a 7-year linear moving average manner, a quadratic curve manner, and a cubic curve manner to obtain apple trend yield. As shown in FIG. 1, the trend yield obtained by the 7-year linear moving average manner is the most consistent with a change trend of actual apple yield in Chengde City and the fitting effect is the best ($R^2$=0.979). Therefore, the 7-year linear moving average manner may be finally used to fit the apple trend yield.

Figure 2:
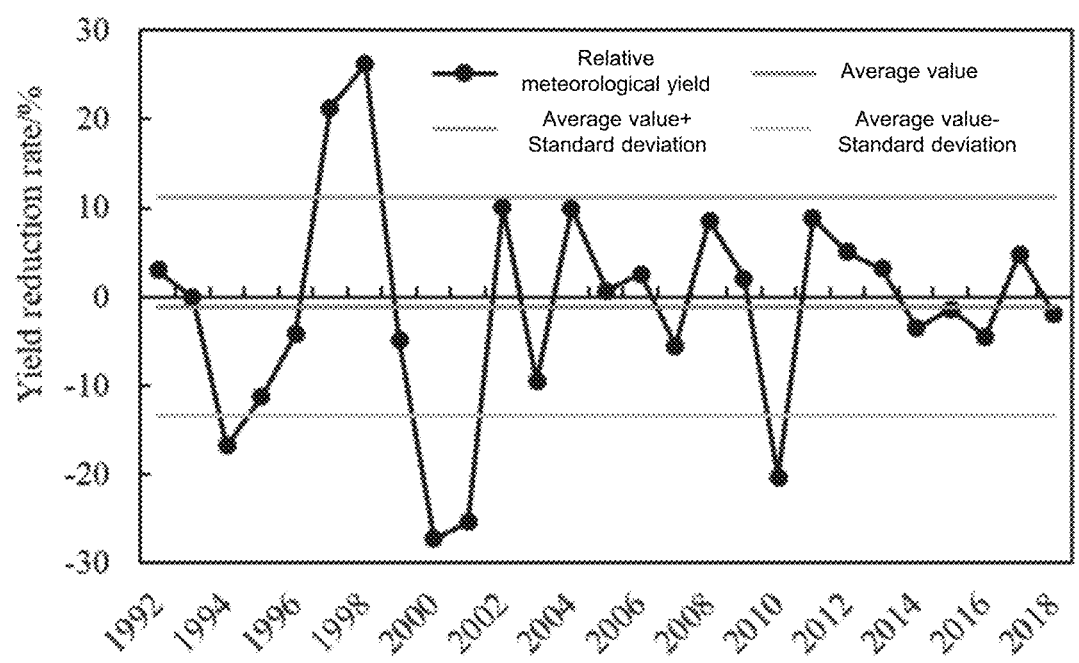
FIG. 2 is a diagram illustrating changes of an apple yield reduction rate according to some embodiments of the present disclosure.

The relative meteorological yield ym represents the apple yield reduction rate, which is a relative value and comparable in space and time. Ym represents a fluctuation range of the actual yield deviating from the trend yield, which may better describe impact of meteorological factors on the apple yield. The calculation equation of Ym may be: Ym=Yw/Yt×100%=(Yd−Yt)/Yt×100%=(Yd/Yt−1)×100%, where Ym denotes the apple yield reduction rate, which also refers to the apple relative meteorological yield. It can be seen that when the actual yield is less than the trend yield, the yield reduction rate is negative, indicating that a meteorological disaster has occurred, resulting in a loss of apple yield. The obtained apple yield reduction rate is shown in FIG. 2.

The water profit and loss ratio of apple fruit during the expansion period may be calculated using the calculation equation of the water profit and loss ratio: WPLR=(P−ETc)/ETc, where WPLR denotes the water profit and loss ratio, P denotes precipitation (mm), and ETc denotes water demand (mm). ETc=Σ(Kc×$ET_0$), where Kc denotes a crop coefficient corrected using a minimum humidity method recommended by FAO56, $ET_0$ denotes a crop reference evapotranspiration calculated according to a Penman-Monteith model. The water profit and loss ratio during the apple fruit expansion period in Chengde City is shown in Table 1.

TABLE 1

| Water profit and loss ratio during the apple fruit expansion period in Chengde City | | | | | | | | | |
| --- | --- | --- | --- | --- | --- | --- | --- | --- | --- |
| Year | 1992 | 1993 | 1994 | 1995 | 1996 | 1997 | 1998 | 1999 | 2000 |
| Water profit and loss ratio | 0.02 | 0.33 | 0.35 | 0.47 | 0.43 | −0.07 | 0.37 | −0.19 | −0.45 |
| Year | 2001 | 2002 | 2003 | 2004 | 2005 | 2006 | 2007 | 2008 | 2009 |
| Water profit and loss ratio | 0.52 | −0.16 | −0.48 | −0.02 | 0.47 | 0.14 | −0.06 | 0.06 | −0.5 |
| Year | 2010 | 2011 | 2012 | 2013 | 2014 | 2015 | 2016 | 2017 | 2018 |
| Water profit and loss ratio | 0.09 | 0.21 | 0.14 | 0.12 | 0.15 | −0.03 | 0.15 | 0.18 | 0.09 |

The weather index threshold may be then determined using a relationship between the apple yield reduction rate and the water profit and loss ratio. It is assumed that there is an optimal water profit and loss ratio during an apple fruit expansion period and a growth period, so that the relative meteorological yield may be the highest. At this time, the optimal water profit and loss ratio may be defined as the weather index threshold. If the water profit and loss ratio is higher or lower than the weather index threshold, the relative meteorological yield may decrease (that is, an absolute value of a yield reduction rate value may increase). That is, it is assumed that there is a one-dimensional quadratic curve: $y=ax^2+bx+c(a<0)$, where y denotes the apple relative meteorological yield, x denotes the water profit and loss ratio during the apple fruit expansion period, a and b denotes regression coefficients, and c denotes a regression constant. The above equation may be transformed to:

$$y = a\left(x+\frac{b}{2a}\right)^2 + \frac{4ac-b^2}{4a},$$

when $x=-b/2a$, y is the largest, and $$y = \frac{4ac-b^2}{4a} = c\frac{b^2}{4a}.$$

Figure 3:
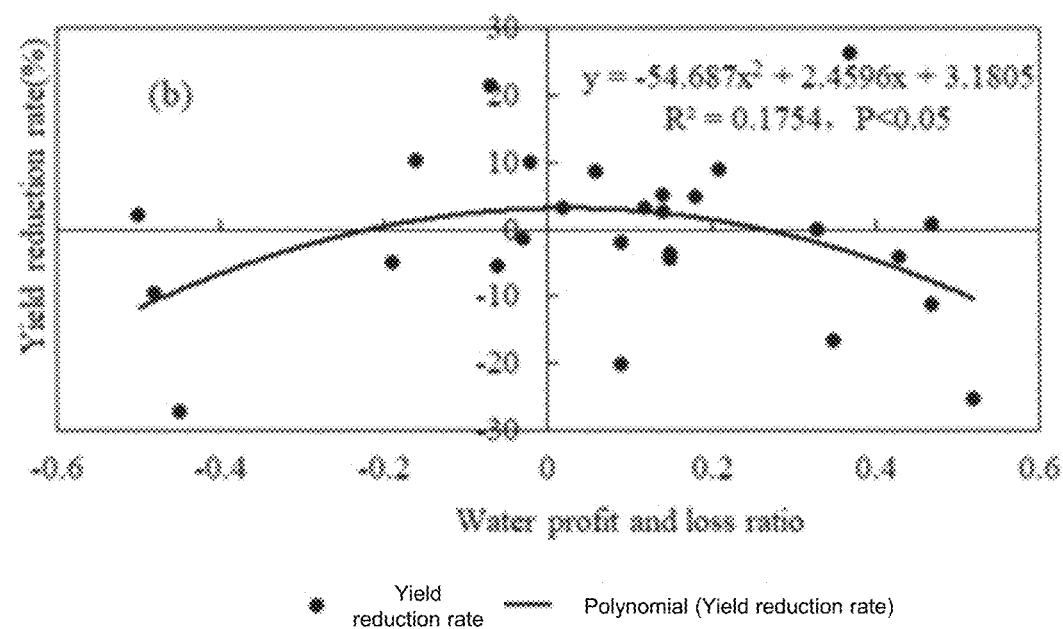
FIG. 3 is a diagram illustrating an optimal curve relationship between a water profit and loss rate and a yield reduction rate during an apple fruit expansion period according to some embodiments of the present disclosure.

Therefore, when $y=-5\%, -10\%$, and $-15\%$, that is, when the yield reduction rate is respectively $-5\%, -10\%$, and $-15\%$, the x value may be a water profit and loss ratio value when a corresponding yield reduction rate occurs. According to the manner for determining the weather index threshold, the fitting result of the water profit and loss ratio during the apple fruit expansion period and the apple yield reduction rate is relatively great, $R^2=0.1754$, which has passed a significance test at a level of 0.05. The fitting result shows that when the drought increases or the flood increases, the apple yield decreases, which is in line with an actual situation as shown in FIG. 3. It may be obtained from the curve relationship between the water profit and loss rate during the apple fruit expansion period and the apple yield reduction rate that when the water profit and loss rate is 0.02, the yield reduction rate is the largest, which is 3.21%. The yield reduction rates of $-5\%, -10\%$, and $-15\%$ may be respectively brought into a quadratic curve equation of the water profit and loss ratio and the yield reduction rate to obtain corresponding water profit and loss ratio values as shown in Table 2. The water profit and loss ratio may be defined as a flood index value when the water profit and loss ratio is positive. The water profit and loss ratio may be defined as a drought index value when the water profit and loss ratio is negative.

TABLE 2

Index values of drought and flood disasters during an apple fruit expansion period corresponding to different yield reduction rates

| Yield reduction rate (%) | Drought index value | Flood index value |
|---|---|---|
| −5 | −0.367 | 0.407 |
| −10 | −0.471 | 0.511 |
| −15 | −0.557 | 0.579 |
| −20 | −0.631 | 0.671 |

Then the occurrence probabilities corresponding to different drought and flood index values calculated based on the information diffusion theory is shown in Table 3. According to the occurrence probability of flood and drought disasters and a size of apple yield loss, an insurance product may be priced, that is, an insurance rate may be determined. The weather index insurance rate may be determined by taking an average loss rate estimated by the weather index as the pure premium rate of crop insurance: $R=E(loss)=\Sigma(p \times loss)$, where R denotes the pure premium rate, loss denotes an apple yield loss, that is, the yield reduction rate, E (loss) denotes an expected value of the apple yield loss, and P denotes an occurrence probability of flood and drought disasters during the apple fruit expansion period.

Assuming that a threshold value of the yield reduction rate is set to −5%, that is, when the apple yield reduction rate reaches −5% or less or when the water profit and loss ratio is greater than 0.407 or less than −0.367, an insurance company may be required to pay according to a contract. Based on the information diffusion theory, it is calculated that the occurrence probabilities of the water profit and loss ratio during the apple fruit expansion period in Chengde City being less than or equal to −0.367 and more than 0.407 are 6.0% and 19.4%. According to the equation, the pure premium rate of the flood and drought disasters is 1.27% when the threshold value is −5%. In a same way, the pure premium rates of flood and drought disasters are respectively 1.22% and 0.54% when the threshold values are −10% and −15%.

TABLE 3

Probabilities of drought and flood disasters and pure premium rates corresponding to different threshold values

| Threshold value (%) | Water profit and loss ratio | Probability (%) (Drought + Flood) | Pure premium rate (%) |
|---|---|---|---|
| −5 | CWD ≤ −0.367 or CWD ≥ 0.407 | 6.0 + 19.4 | 1.27 |
| −10 | CWD ≤ −0.471 or CWD ≥ 0.511 | 3.1 + 9.1 | 1.22 |
| −15 | CWD ≤ −0.577 or CWD ≥ 0.597 | 0.1 + 3.5 | 0.54 |

An addition rate may need to be added to an actual insurance rate, that is, $Ra=R \times (1+Sf) \times (1+Be) \times (1+Sr)$, where Ra denotes the actual insurance rate, Sf denotes a safety factor, which is taken as 15%, Be denotes business expenses, which is taken as 20%, and Sr denotes a predetermined surrate, which is taken as 5%. The actual insurance rates at threshold values of −5%, −10% and −15% are respectively 1.84%, 1.77% and 0.78%. Assuming that an insurance amount per mu of flood and drought disasters on apples is CNY 3,000, the premium is a product of the insurance amount and the insurance rate. That is, the premiums at threshold values of −5%, −10%, and −15% are respectively CNY 55.2, CNY 53.1, and CNY 23.4 per mu.

Figure 4:
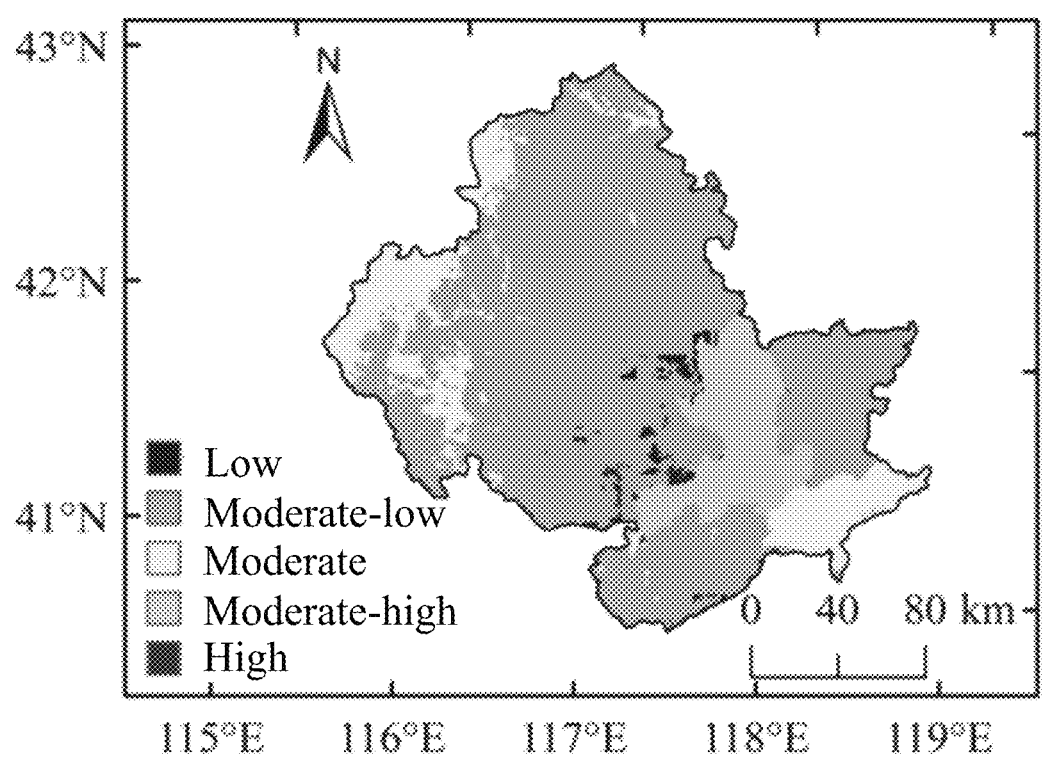
FIG. 4 is a distribution diagram illustrating comprehensive risk assessment of a drought disaster according to some embodiments of the present disclosure.
Figure 5:
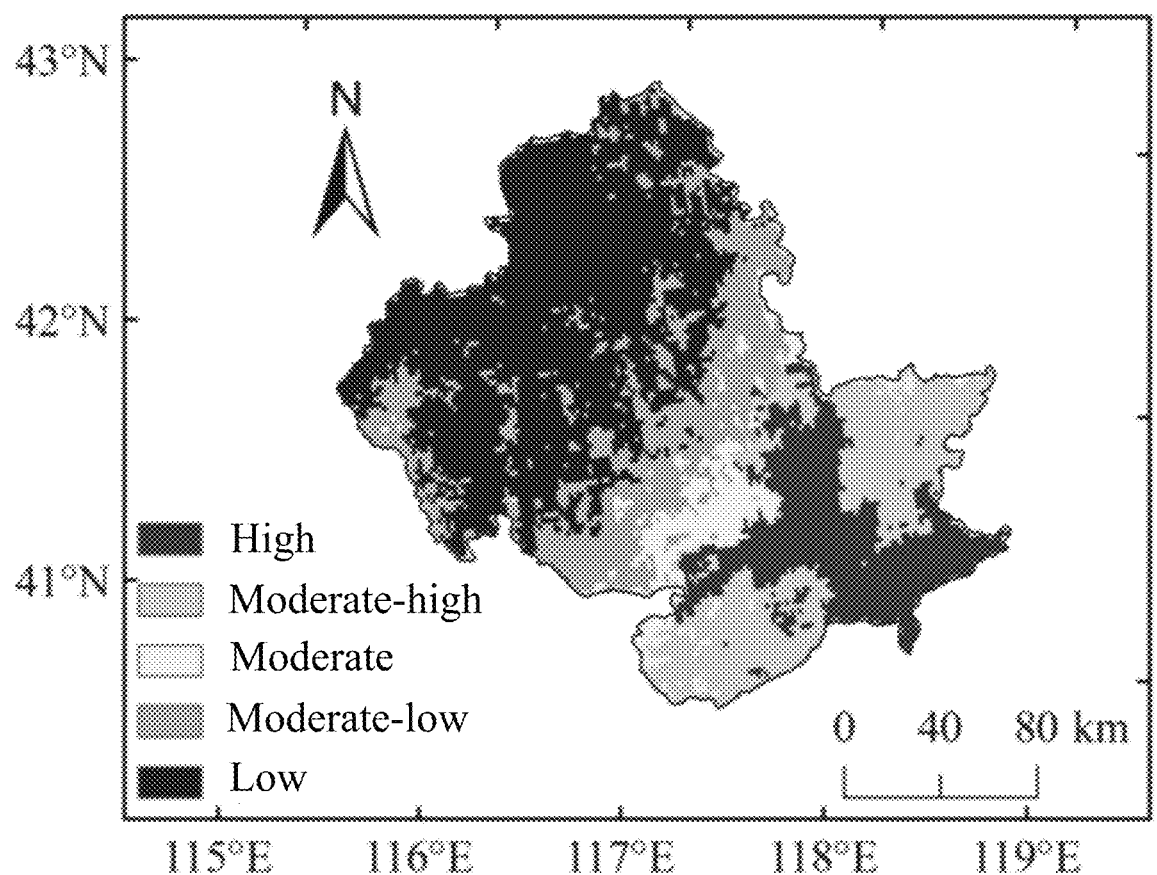
FIG. 5 is a distribution diagram illustrating comprehensive risk assessment of a flood disaster according to some embodiments of the present disclosure.
Figure 6:
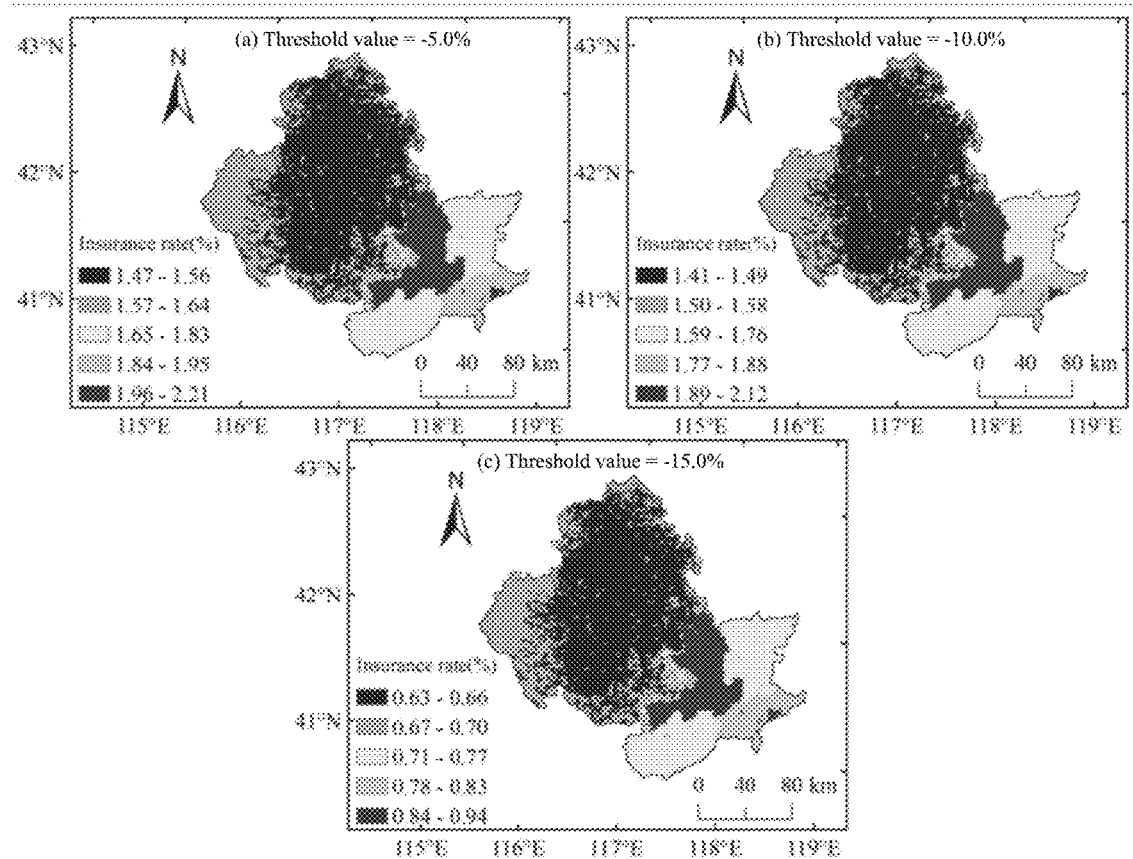
FIG. 6 is a spatial distribution diagram illustrating insurance rates for flood and drought disasters during an apple fruit expansion period according to some embodiments of the present disclosure.
Figure 7:
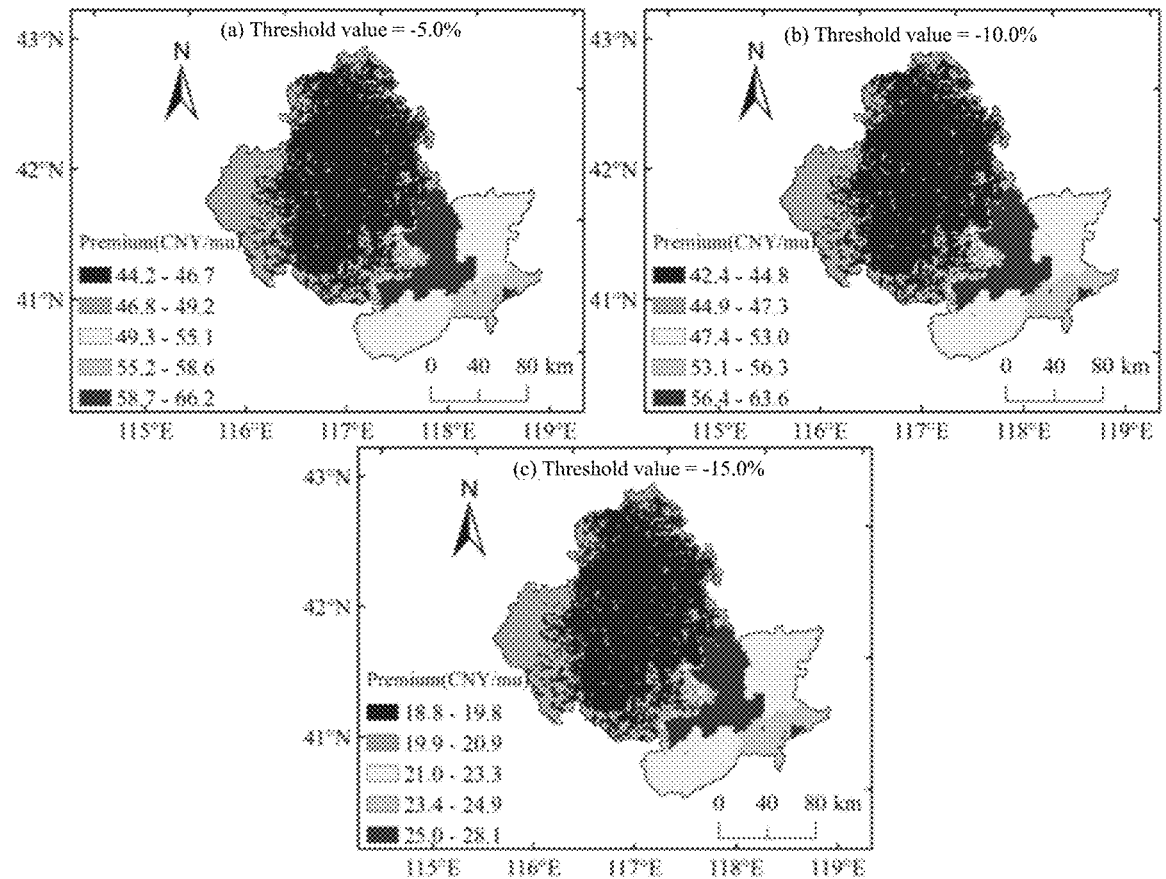
FIG. 7 is a spatial distribution diagram illustrating premiums for flood and drought disasters during an apple fruit expansion period according to some embodiments of the present disclosure.

The comprehensive risk index models of drought and flood disasters may be built from a perspective such as risk of disaster-causing factor, sensitivity of disaster-pregnant environment, vulnerability index of disaster, etc. using terrain, rivers, vegetation, apple planting area, and water profit and loss ratio, etc. As shown in FIG. 4 and FIG. 5, according to spatial distribution of drought and flood disaster risk during the apple fruit expansion period in Chengde City, it may be seen that the spatial distribution of flood and drought disaster risk in Chengde City varies in size. If a same insurance clause is applied to the whole city, a relatively large basis risk may be caused. Therefore, a comprehensive risk index of drought disaster and a comprehensive risk index of flood disaster may be first normalized respectively. The normalized comprehensive risk index of drought disaster and the normalized comprehensive risk index of flood disaster may be added together, and then standardized processing may be performed according to an equation. correction coefficient=(index value−minimum index value)/ (maximum index value−minimum index value)×0.4+0.8. The obtained correction coefficient may fluctuate between 0.8 and 1.2 according to a level of drought and flood disaster risk. A corrected pure premium rate may be R'=k×r, where K denotes a correction coefficient, R denotes an original pure premium rate. Then the actual insurance rate and premium at different threshold values may be calculated. Assuming that an insurance amount per mu of flood and drought disasters on apples is CNY 3,000, the premium may be a product of the insurance amount and the insurance rate. FIGS. 6 and 7 show spatial distribution of insurance rates and premiums for flood and drought disasters during the apple fruit expansion period in Chengde City at different threshold values. It may be seen that for an region with relatively high disaster risk, the insurance rate and the premium may also be relatively high. For an region with relatively low disaster risk, the insurance rate and the premium may also be relatively low. For example, the insurance rates and the premiums in the southeastern of Chengde City are higher than those in the northwest of Chengde city. Taking the threshold value of −5.0% as an example, the insurance rate in the northwestern of Chengde City is basically between 1.47% and 1.64%, and the premium is between CNY 44.2 and CNY 49.2 per mu. Most of the insurance rates in southeastern of Chengde City are above 1.65%. The insurance rates around Chengde County in Chengde City are the highest, ranging from 1.96 to 2.21, and the premiums range from CNY 58.7 to CNY 66.2 per mu.

Calculation of a compensation pay-outs: when insured apples suffer from drought or flood damage during the apple fruit expansion period (June-August), an insurer may calculate a compensation as follows:

(1) All losses: when a loss rate of insured apples is more than 15% (exclusive), it may be regarded as a total loss, and the compensation may be made according to the insurance amount per mu: compensation pay-outs (CNY)=insurance amount per unit area (CNY/mu)×loss area (mu).

(2) Partial loss: When the degree of the loss of the insured apple does not reach a threshold value, that is, when the yield reduction rate is more than −5% or the yield reduction rate is more than −10%, no compensation may be made. When the degree of the loss exceeds the threshold value (inclusive), for example, when the yield reduction rate is less than or equal to −5% or the yield reduction rate is less than or equal to −10%, an excess part may be paid according to the insurance amount and the degree of loss at a time of an accident: compensation pay-outs(CNY)=insurance amount per unit area (CNY/mu)×loss area (mu)×(loss degree −threshold value).

Taking the threshold value of −5.0% as an example, assuming that the insurance amount of apples in Chengde City is 3,000 CNY/mu, according to the above regulations, when the water profit and loss ratio during the apple fruit expansion period is between −0.367 and 0.407, that is, when the apple yield reduction rate is more than −5.0%, and a drought and flood condition has not reached the compensation level, an insurance company may be not required to pay to farmers. When the water profit and loss ratio during the apple fruit expansion period is less than or equal to −0.367 or more than or equal to 0.407, the insurance company may be required to start to pay according to the loss of apples caused by the degree of drought and flood disasters. If an apple yield of the local insured apple orchard during the apple fruit expansion period in Chengde City is reduced by 10% due to drought or flood, that is, the water profit and loss ratio calculated according to the meteorological conditions is −0.471 or 0.511, an insurance company may calculate the compensation pay-outs according to the plan (2). After calculation, the insurance company may be required to pay insured farmers 1,500 CNY/mu. If an apple yield in the local insured apple orchard during the apple fruit expansion period in Chengde City is reduced by more than 15% due to drought or flood, that is, when the water profit and loss ratio is 0.597, an insurance company may be required to pay insured farmers 3,000 CNY/mu.

The present disclosure adopts the optimal curve relationship between the apple yield reduction rate and the drought and flood indexes, and considers the two disasters of drought and flood at the same time, provides a method for assessing comprehensive risk of drought and flood disaster on apples, and determines the weather index threshold value under the threshold values of different yield reduction rates, at the same time, determines the insurance rate according to the level of disaster risk, and obtains insurance rates and premiums in different regions according to local conditions, thereby formulating a design scheme of insurance products suitable for local conditions, which has great advantages and can meet design requirements of weather index insurance products compared with a traditional single-disaster weather index insurance.

Figure 8:
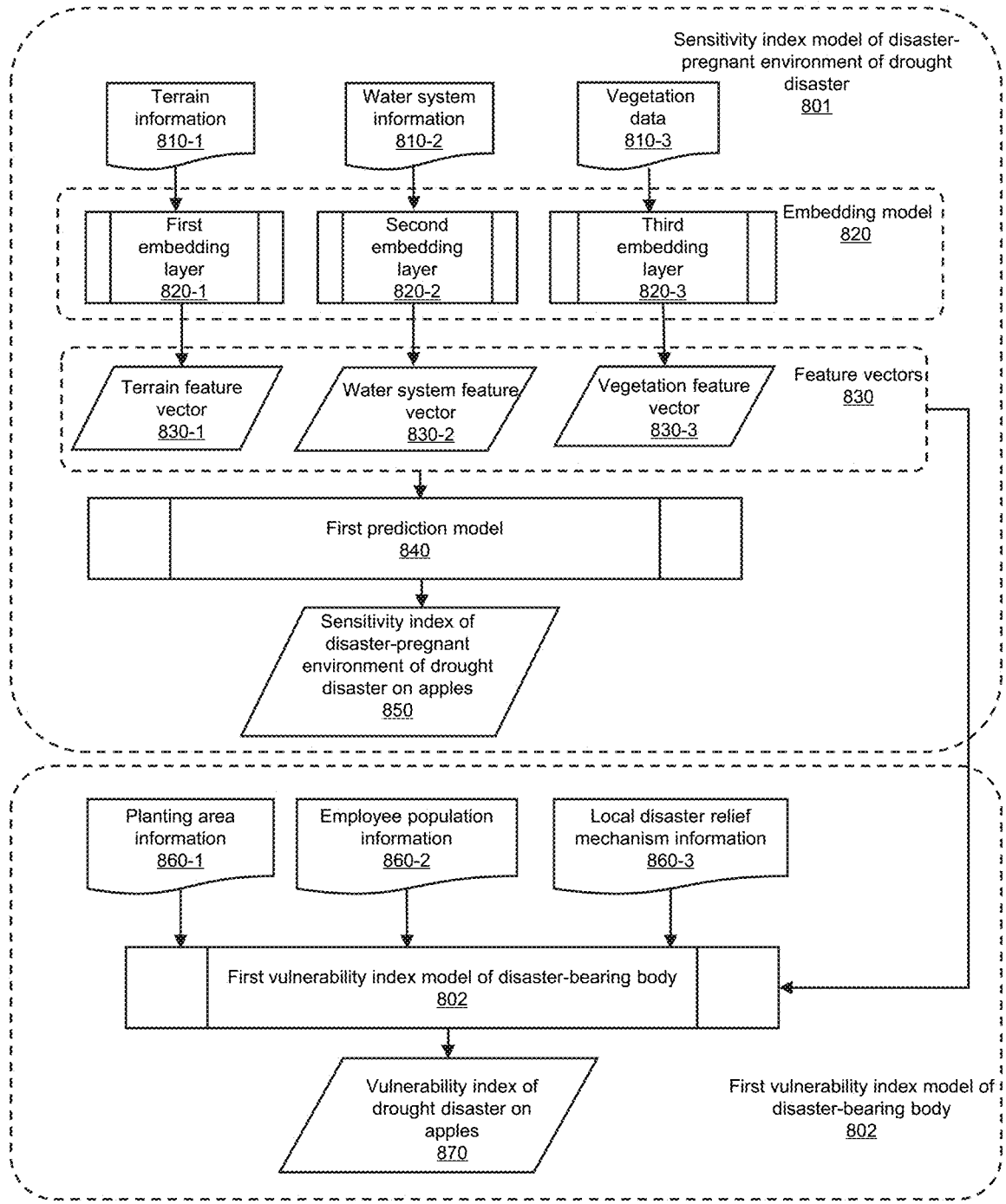
FIG. 8 is an exemplary schematic diagram illustrating a sensitivity index model of disaster-pregnant environment of drought disaster and a first vulnerability index model of disaster-bearing body according to some embodiments of the present disclosure.

FIG. 8 is an exemplary schematic diagram illustrating a sensitivity index model of disaster-pregnant environment of drought disaster and a first vulnerability index model of disaster-bearing body according to some embodiments of the present disclosure.

In some embodiments, the sensitivity index model of disaster-pregnant environment of drought disaster 801 may be a machine learning model. The sensitivity index model of disaster-pregnant environment of drought disaster 801 may be configured to predict a sensitivity index of disaster-pregnant environment of drought disaster on apples 850. As shown in FIG. 8, in some embodiments, the sensitivity index model of disaster-pregnant environment of drought disaster 801 may include an embedding model 820 and a first prediction model 840.

The sensitivity index of disaster-pregnant environment of drought disaster on apples 850 may be an index reflecting the environment sensitivity of an apple planting region to a drought disaster. In some embodiments, the sensitivity index of disaster-pregnant environment of drought disaster on apples may be expressed in various forms, for example, which may be expressed as a numerical value of 0-10. The larger the value is, the greater the environment sensitivity of the apple planting region to the drought disaster is. As another example, the sensitivity index of disaster-pregnant environment of drought disaster on apples may be expressed as level 1, level 2, insensitive, sensitive, etc. In some embodiments, the sensitivity index of disaster-pregnant environment of drought disaster on apples may be related to geomorphological information, river and lake information and information of plant community covering the surface in the apple planting region.

In some embodiments, the geomorphological information of the apple planting region may include a feature such as an elevation value, a geomorphological type, a soil type, and a land utilization rate. In some embodiments, the river and lake information of the apple planting region may include a feature such as a water network density, a length and width of a river channel, an average flow of a river channel, a lake capacity, etc. In some embodiments, the information of plant community covering the surface in the apple planting region may include a feature such as a vegetation type, a vegetation growth state, a vegetation coverage, etc. In some embodiments, the more appropriate the geomorphology, the river and lake, and the plant community covering the surface in the apple planting region are for planting apples, the lower the sensitivity index of disaster-pregnant environment of drought disaster on apples in the region is. For example, there may be 2 apple planting regions A and B. The apple planting region A may have a flat terrain, abundant water resources, and high vegetation coverage, while the apple planting region B may have a rugged terrain, few water resources, and low vegetation coverage. Therefore, the environment sensitivity of A to the drought disaster may be lower than that of B.

The embedding model 820 may be configured to generate feature vectors 830 based on an input. A processing process of the embedding layer may be essentially a process of extracting depth information. In some embodiments, the embedding model 820 may include a first embedding layer 820-1, a second embedding layer 820-2, and a third embedding layer 820-3. In some embodiments, the embedding layer may include a machine learning model, such as an Embedding layer.

The first embedding layer 820-1 may be configured to generate a terrain feature vector 830-1 based on terrain information 810-1. The terrain information may be relevant information of a geographic pattern of the apple planting region. The terrain feature vector may be a relevant feature that reflects geomorphology of the apple planting region. In some embodiments, the terrain feature vector obtained through the first embedding layer may include features such as elevations of a plurality of terrain sampling points in the apple planting region, and a standard deviation of the plurality of elevations. For example, terrain feature vector d=(6.3 m, 5.0 m, 5.5 m, 6.1 m, 0.512), which may represent the elevations of the four terrain sampling points of the apple planting region are respectively 6.3 m, 5.0 m, 5.5 m, and 6.1 m, and the standard deviation of the four elevations is 0.512.

The second embedding layer 820-2 may be configured to generate a water system feature vector 830-2 based on water system information 810-2. The water system information may be relevant information of all water systems in the apple planting region. The water system feature vector may reflect a relevant feature of a water network system composed of various water bodies such as all rivers, lakes, etc. in the apple planting region. In some embodiments, the water system feature vector obtained through the second embedding layer may include a feature such as a water network density, a length and width of a river channel, an average flow of a river channel, a lake capacity, etc. of the apple planting region.

The third embedding layer 820-3 may be configured to generate a vegetation feature vector 830-3 based on vegetation data 810-3. The vegetation data may be relevant information of vegetation coverage in the apple planting region. The vegetation feature vector may be a relevant feature of the plant community covering the surface in the apple planting region. In some embodiments, the vegetation feature vector obtained through the third embedding layer may include a feature such as a vegetation type, a vegetation growth state, a vegetation coverage, etc.

The first prediction model 840 may be configured to predict the sensitivity index of disaster-pregnant environment of drought disaster on apples 850 based on the inputted feature vectors 830. The feature vectors 830 may include the terrain feature vector 830-1, the water system feature vector 830-2, and the vegetation feature vector 830-3. In some embodiments, the first prediction model may be a machine learning model, such as a neural network model.

In some embodiments, a first vulnerability index model of disaster-bearing body 802 may be configured to predict a vulnerability index of drought disaster on apples 870. In some embodiments, the first vulnerability index model of disaster-bearing body may be a machine learning model, such as a neural network model, a deep neural network, and a convolutional neural network, etc.

The vulnerability index of drought disaster on apples 870 may be an index that reflects endurance of an apple planting region to a drought disaster. In some embodiments, the vulnerability index of drought disaster on apples may be expressed in various forms, for example, which may be expressed as a numerical value of 0-10. The larger the value is, the stronger the endurance of the apple planting region to the drought disaster is. As another example, the vulnerability index of drought disaster on apples may also be expressed as strong, medium, weaker, etc. In some embodiments, the vulnerability index of drought disaster on apples may be related to a planting area, a count of employees, a disaster relief mechanism of the apple planting region.

As shown in FIG. 8, an input of the first vulnerability index model of disaster-bearing body 802 may include planting area information 860-1, employee population information 860-2, local disaster relief mechanism information 860-3.

The planting area information 860-1 may be relevant information that reflects the apple planting area. In some embodiments, the planting area information may be determined based on the apple planting area and the agricultural acreage. For example, if a total agricultural acreage of an apple planting town in 2020 is 600,000 mu, including the apple planting area of 280,000 mu, the planting area information in the region may include that apple planting area accounts for 47% of the total agricultural acreage. In some embodiments, the planting area information may also include an annual income per unit planting area, etc.

The employee population information 860-2 may be relevant information that reflects an employee population of apple planting. In some embodiments, the employee population information may be determined based on a count of employees of apple planting and a total population. For example, if the total population of an apple planting town in 2020 is 712,000, and the count of employees of apple planting is 11,000, the employee population information in the region may include that the count of employees of apple planting accounts for 1.54% of the total population. In some embodiments, the employee population information may further include information such as an employee population density, a local per capita employment income, etc.

The local disaster relief mechanism information 860-3 may be relevant information that reflects the apple planting region can enjoy relief after suffering from a disaster. In some embodiments, the local disaster relief mechanism information may include a local agricultural disaster relief provident fund and a special financial disaster relief fund. In some embodiments, the information of the local disaster relief mechanism may also include information such as an emergency relief system and an operating mechanism of a natural disaster.

In some embodiments, the input of the first vulnerability index model of disaster-bearing body 802 may also include the feature vectors 830. In some embodiments, the feature vectors 830 output by the embedding model 820 may be designated as the input of the first vulnerability index model of disaster-bearing body 802.

By designating the feature vector output by the embedding model as the input of the first vulnerability index model of disaster-bearing body, the model may learn the endurance of the apple planting region to the disaster from the features such as the geomorphology, the river and lake, and the plant community covering the surface in the apple planting region, which can make the model predict the vulnerability index of drought disaster on apples more accurate.

In some embodiments, the sensitivity index model of disaster-pregnant environment of drought disaster 801 and the first vulnerability index model of disaster-bearing body 802 may be obtained based on joint training. For example, the sensitivity index model of disaster-pregnant environment of drought disaster and the first vulnerability index model of disaster-bearing body may be trained based on a large number of labeled training samples. The label may include a first label and a second label. In some embodiments, the training samples may include a plurality of sets of historical relevant information data of the apple planting region, and specifically include a plurality of sets of historical terrain information, water system information, vegetation information, planting area information, employee population information, local disaster relief mechanism information of the apple planting region. The training samples may be obtained based on a statistical yearbook of apple planting. The first label may be a sensitivity score of drought disaster-pregnant environment of the apple planting region. The second label may be an apple drought disaster vulnerability score of the apple planting region. In some embodiments, the first label and the second label may be obtained based on expert evaluation. In some embodiments, the second label may also be obtained based on a historical actual drought disaster situation in the apple planting region. For example, a historical actual per capita loss affected by a drought disaster may be designated as the second label.

In some embodiments, the terrain information of the apple planting region in the training sample may be input into the first embedding layer of an initial sensitivity index model of disaster-pregnant environment of drought disaster, and the first embedding layer may output the terrain feature vector. The water system information of the apple planting region in the training sample may be input into the second embedding layer of the initial sensitivity index model of disaster-pregnant environment of drought disaster, and the second embedding layer may output the water system feature vector. The vegetation data of the apple planting region in the training sample may be input into the third embedding layer of the initial sensitivity index model of disaster-pregnant environment of drought disaster, and the third embedding layer may output the vegetation feature vector. The obtained terrain feature vector, the obtained water system feature vector, and the obtained vegetation feature vector may be input into the first prediction model, and the sensitivity index of disaster-pregnant environment of drought disaster on apples may be output. A first loss term may be established based on the outputted sensitivity index of disaster-pregnant environment of drought disaster on apples and the first label. The planting area information, the employee population information, the local disaster relief mechanism information of the apple planting region in the training sample, the terrain feature vector, the water system feature vector, the vegetation feature vector output from three embedding layers of the initial sensitivity index model of disaster-pregnant environment of drought disaster may be input into an initial first vulnerability index model of disaster-bearing body, and a second loss term may be established based on the outputted sensitivity index of disaster-pregnant environment of drought disaster on apples and the second label. A loss function may be determined based on the first loss term and the second loss term. Parameters of the sensitivity index model of disaster-pregnant environment of drought disaster and parameters of the first vulnerability index model of disaster-bearing body may be updated based on the loss function. Training may be performed in various manners, for example, a gradient descent method. The trained sensitivity index model of disaster-pregnant environment of drought disaster 801 and the trained first vulnerability index model of disaster-bearing body 802 may be obtained.

Since the feature vectors output by the embedding layers of the sensitivity index model of disaster-pregnant environment of drought disaster are the input of the first vulnerability index model of disaster-bearing body, the joint training of the sensitivity index model of disaster-pregnant environment of drought disaster and the first vulnerability index model of disaster-bearing body can save training cost and improve training efficiency.

Predicting the sensitivity index of disaster-pregnant environment of drought disaster on apples and the vulnerability index of drought disaster on apples in the apple planting region using the machine learning model can achieve a better prediction result, which can further improve accuracy of the comprehensive risk index model of drought disaster.

Figure 9:
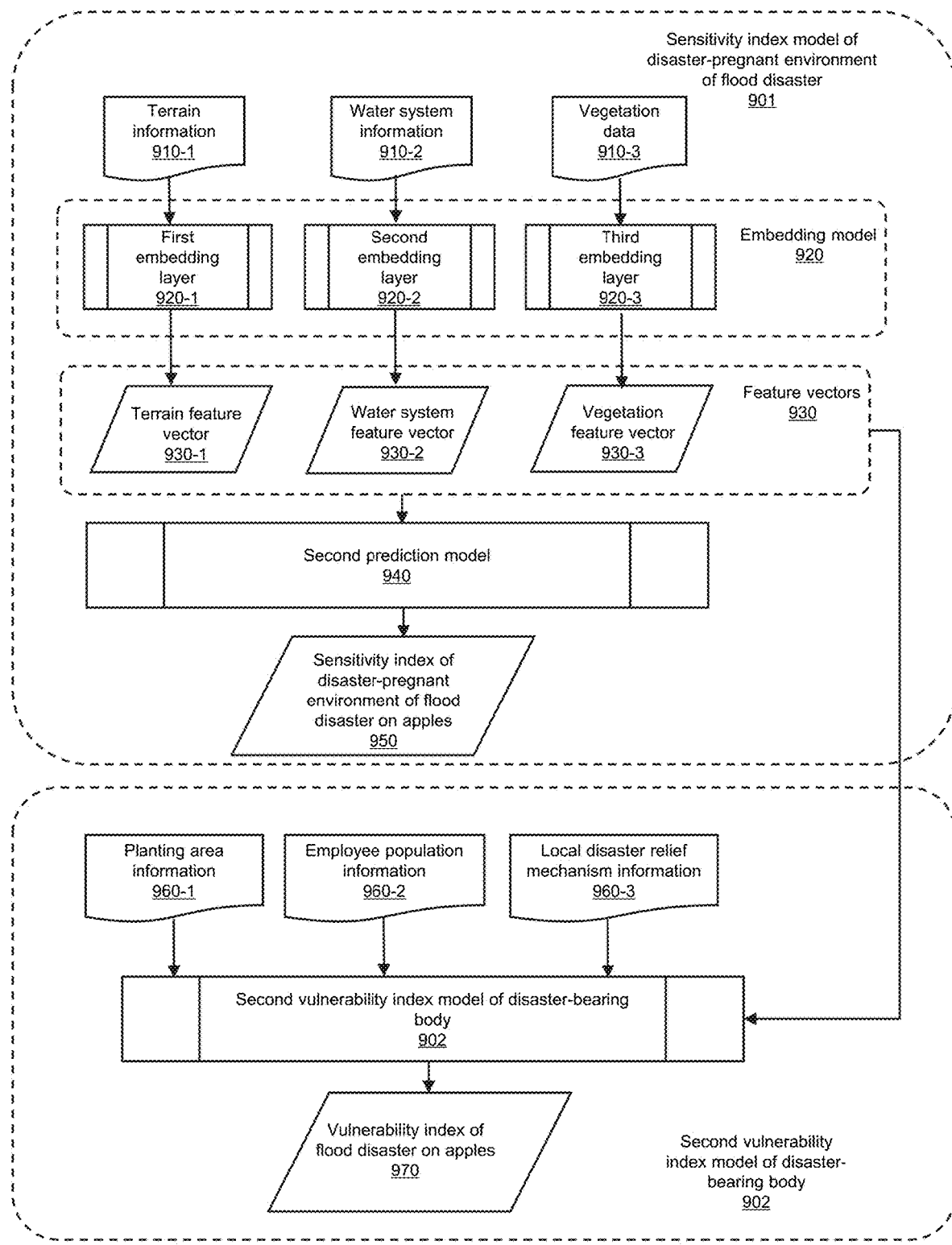
FIG. 9 is an exemplary schematic diagram illustrating a sensitivity index model of disaster-pregnant environment of flood disaster and a second vulnerability index model of disaster-bearing body according to some embodiments of the present disclosure.

FIG. 9 is an exemplary schematic diagram illustrating a sensitivity index model of disaster-pregnant environment of flood disaster and a second vulnerability index model of disaster-bearing body according to some embodiments of the present disclosure.

The sensitivity index model of disaster-pregnant environment of flood disaster 901 may be configured to predict a sensitivity index of disaster-pregnant environment of flood disaster on apples 950. In some embodiments, the sensitivity index model of disaster-pregnant environment of flood disaster may be a machine learning model. As shown in FIG. 9, the sensitivity index model of disaster-pregnant environment of flood disaster 801 may include an embedding model 920 and a second prediction model 940.

The sensitivity index of disaster-pregnant environment of flood disaster on apples 950 may be an index reflecting the environment sensitivity of an apple planting region to a flood disaster. In some embodiments, the sensitivity index of disaster-pregnant environment of flood disaster on apples may be expressed in various forms, for example, which may be expressed as a numerical value of 0-100%. The larger the value is, the greater the environment sensitivity of the apple planting region to the flood disaster is. As another example, the sensitivity index of disaster-pregnant environment of flood disaster on apples may be expressed as level 1, level 2, insensitive, sensitive, etc. In some embodiments, the sensitivity index of disaster-pregnant environment of flood disaster on apples may be related to geomorphological information, river and lake information, and information of plant community covering the surface in the apple planting region.

In some embodiments, the sensitivity index model of disaster-pregnant environment of drought disaster and the sensitivity index model of disaster-pregnant environment of flood disaster may share a same embedding model, that is, the embedding model 920 and the embedding model 820 may be a same model.

Therefore, more descriptions regarding terrain information 910-1, water system information 910-2, vegetation data 910-3, a first embedding layer 920-1, a second embedding layer 920-2, and a third embedding layer 920-3, a terrain feature vector 930-1, a water system feature vector 930-2, a vegetation feature vector 930-3 may be found in FIG. 8 and relevant descriptions thereof.

The sensitivity index model of disaster-pregnant environment of drought disaster and the sensitivity index model of disaster-pregnant environment of flood disaster may share a same embedding model, on the one hand, which can save cost of training and improve efficiency, on the other hand, which can maintain consistency of the feature vectors in the two models, so that prediction of the models can be more accurate.

The second prediction model 940 may be configured to predict the sensitivity index of disaster-pregnant environment of flood disaster on apples 950 based on the input feature vectors 930. In some embodiments, the second prediction model may be a machine learning model, such as a neural network model.

A second vulnerability index model of disaster-bearing body 902 may be configured to predict a vulnerability index of flood disaster on apples 970. In some embodiments, the second vulnerability index model of disaster-bearing body may be a machine learning model, such as a neural network model, a deep neural network, and a convolutional neural network, etc.

In some embodiments, the input features of the second vulnerability index model of disaster-bearing body 902 may be the same as those of the first vulnerability index model of disaster-bearing body 802. Therefore, more descriptions regarding planting area information 860-1, employee population information 860-2, local disaster relief mechanism information 860-3, feature vectors 930, the terrain feature vector 930-1, the water system feature vector 930-2, the vegetation feature vector 930-3 may be found in FIG. 8 and relevant descriptions thereof.

The vulnerability index of flood disaster on apples 970 may be an index that reflects endurance of an apple planting region to a flood disaster. In some embodiments, the vulnerability index of flood disaster on apples may be expressed in various forms, for example, which may be expressed as a numerical value of 0-10. The larger the value is, the stronger the endurance of the apple planting region to the flood disaster is. As another example, the vulnerability index of drought disaster on apples may also be expressed as level 1, level 2, etc. In some embodiments, the vulnerability index of flood disaster on apples may be related to a planting area, a count of employees, a disaster relief mechanism of the apple planting region.

As shown in FIG. 9, an input of the second vulnerability index model of disaster-bearing body 902 may include planting area information 960-1, employee population information 960-2, local disaster relief mechanism information 960-3, and the feature vectors 930. The feature vector 930 may include the terrain feature vector 930-1, the water system feature vector 930-2, and the vegetation feature vector 930-3. More descriptions regarding the above content may be found in FIG. 8 and relevant descriptions thereof.

In some embodiments, the sensitivity index model of disaster-pregnant environment of drought disaster 901 and the second vulnerability index model of disaster-bearing body 902 may be obtained based on joint training. For example, the sensitivity index model of disaster-pregnant environment of flood disaster and the second vulnerability index model of disaster-bearing body may be trained based on a large number of labeled training samples. The label may include a third label and a fourth label.

In some embodiments, the training samples may include a plurality of sets of historical relevant information data of the apple planting region, and specifically include a plurality of sets of historical terrain information, water system information, vegetation information, planting area information, employee population information, local disaster relief mechanism information of the apple planting region. The training samples may be obtained based on a statistical yearbook of apple planting. The third label may be a sensitivity score of flood disaster-pregnancy environment of the apple planting region. The fourth label may be an apple drought disaster vulnerability score of the apple planting region. In some embodiments, the third label and the fourth label may be obtained based on expert evaluation. In some embodiments, the fourth label may also be obtained based on a historical actual flood disaster situation in the apple planting region. For example, a historical actual per capita loss affected by a flood disaster may be designated as the fourth label.

In some embodiments, the terrain information of the apple planting region in the training sample may be input into the first embedding layer of an initial sensitivity index model of disaster-pregnant environment of flood disaster, and the first embedding layer may output the terrain feature vector. The water system information of the apple planting region in the training sample may be input into the second embedding layer of the initial sensitivity index model of disaster-pregnant environment of flood disaster, and the second embedding layer may output the water system feature vector. The vegetation data of the apple planting region in the training sample may be input into the third embedding layer of the initial sensitivity index model of disaster-pregnant environment of flood disaster, and the third embedding layer may output the vegetation feature vector. The obtained terrain feature vector, the obtained water system feature vector, and the obtained vegetation feature vector may be input into the second prediction model, and the sensitivity index of disaster-pregnant environment of flood disaster on apples may be output. A third loss term may be established based on the output sensitivity index of disaster-pregnant environment of flood disaster on apples and the third label. The planting area information, the employee population information, the local disaster relief mechanism information of the apple planting region in the training sample, the terrain feature vector, the water system feature vector, the vegetation feature vector output from the embedding model of the initial sensitivity index model of disaster-pregnant environment of flood disaster may be input into an initial second vulnerability index model of disaster-bearing body, and a fourth loss term may be established based on the output sensitivity index of disaster-pregnant environment of flood disaster on apples and the fourth label. A loss function may be determined based on the third loss term and the fourth loss term. Parameters of the sensitivity index model of disaster-pregnant environment of flood disaster and parameters of the second vulnerability index model of disaster-bearing body may be updated based on the loss function. Training may be performed in various manners, for example, a gradient descent method. The trained sensitivity index model of disaster-pregnant environment of flood disaster 901 and the trained second vulnerability index model of disaster-bearing body 902 may be obtained.

Since the feature vectors output by the embedding layers of the sensitivity index model of disaster-pregnant environment of flood disaster are the input of the second vulnerability index model of disaster-bearing body, the joint training of the sensitivity index model of disaster-pregnant environment of flood disaster and the second vulnerability index model of disaster-bearing body can save training cost and improve training efficiency.

In some embodiments, the sensitivity index model of disaster-pregnant environment of drought disaster 801 and the first vulnerability index model of disaster-bearing body 802, the sensitivity index model of disaster-pregnant environment of flood disaster 901 and the second vulnerability index model of disaster-bearing body 902 may be jointly trained. For example, the above four models may be trained based on a large number of labeled training samples. The label may include a first label, a second label, a third label, and a fourth label.

In some embodiments, the training samples may include a plurality of sets of historical relevant information data of the apple planting region, and specifically include a plurality of sets of historical terrain information, water system information, vegetation information, planting area information, employee population information, local disaster relief mechanism information of the apple planting region. The training samples may be obtained based on a statistical yearbook of apple planting. The first label may be a sensitivity score of drought disaster-pregnancy environment of the apple planting region. The second label may be an apple drought disaster vulnerability score of the apple planting region. The third label may be a sensitivity score of flood disaster-pregnancy environment of the apple planting region. The fourth label may be an apple flood disaster vulnerability score of the apple planting region. In some embodiments, the first label, the second label, the third label, and the fourth label may be obtained based on expert evaluation. In some embodiments, the second label may also be obtained based on a historical actual drought disaster situation in the apple planting region. For example, a historical actual per capita loss affected by a drought disaster may be designated as the second label. In some embodiments, the fourth label may also be obtained based on a historical actual flood disaster situation in the apple planting region. For example, a historical actual per capita loss affected by a flood disaster may be designated as the fourth label.

In some embodiments, the terrain information of the apple planting region in the training sample may be input into the first embedding layer of an initial sensitivity index model of disaster-pregnant environment of drought disaster, and the first embedding layer may output the terrain feature vector. The water system information of the apple planting region in the training sample may be input into the second embedding layer of the initial sensitivity index model of disaster-pregnant environment of drought disaster, and the second embedding layer may output the water system feature vector. The vegetation data of the apple planting region in the training sample may be input into the third embedding layer of the initial sensitivity index model of disaster-pregnant environment of drought disaster, and the third embedding layer may output the vegetation feature vector. The obtained terrain feature vector, the obtained water system feature vector, and the obtained vegetation feature vector may be input into the first prediction model, and the sensitivity index of disaster-pregnant environment of drought disaster on apples may be output. A first loss term may be established based on the output sensitivity index of disaster-pregnant environment of drought disaster on apples and the first label. The planting area information, the employee population information, the local disaster relief mechanism information in the training sample, the terrain feature vector, the water system feature vector, the vegetation feature vector output from embedding model of the initial sensitivity index model of disaster-pregnant environment of drought disaster may be input into an initial first vulnerability index model of disaster-bearing body, and a second loss term may be established based on the output sensitivity index of disaster-pregnant environment of drought disaster on apples and the second label.

The terrain feature vector, the water system feature vector, and the vegetation feature vector output by the embedding model of the initial sensitivity index model of disaster-pregnant environment of drought disaster may be input into the second prediction model of the initial sensitivity index model of disaster-pregnant environment of flood disaster, and the sensitivity index of disaster-pregnant environment of flood disaster on apples may be output. A third loss term may be established based on the sensitivity index of disaster-pregnant environment of flood disaster on apples and the third label. The planting area information, the employee population information, the local disaster relief mechanism information in the training sample, the terrain feature vector, the water system feature vector, the vegetation feature vector output from the embedding model may be input into an initial second vulnerability index model of disaster-bearing body, and a fourth loss term may be established based on the output sensitivity index of disaster-pregnant environment of flood disaster on apples and the fourth label.

A loss function may be determined based on the first loss term, the second loss term, the third loss term, and the fourth loss term. Parameters of the models may be updated based on the loss function. Training may be performed in various manners, for example, a gradient descent method. The trained sensitivity index model of disaster-pregnant environment of drought disaster 801, the trained first vulnerability index model of disaster-bearing body 802, the trained sensitivity index model of disaster-pregnant environment of flood disaster 901, and the trained second vulnerability index model of disaster-bearing body 902 may be obtained.

In some embodiments, the loss function may include drought loss terms and a drought loss weight, flood loss terms and a flood loss weight. The drought loss terms may include the first loss term and the second loss term. The flood loss terms may include the third loss term and the fourth loss term. In some embodiments, the drought loss weight and the flood loss weight may be related to drought and flood index values. The drought and flood index values may reflect severity of impact of drought or flood disasters. For example, if the water profit and loss ratio is negative, and the drought and flood index values reflect that the impact of drought is greater than that of flood, the drought loss weight may be set to be larger than the flood loss weight. Accordingly, if the water profit and loss ratio is positive, and the drought and flood index values reflect that the impact of flood is greater than that of drought, the drought loss weight may be set to be smaller than the flood loss weight. More descriptions regarding the drought and flood index values may be found elsewhere in the present disclosure.

By setting the drought loss weight and the flood loss weight in the joint training process of the sensitivity index model of disaster-pregnant environment of drought disaster 801, the first vulnerability index model of disaster-bearing body 802, the sensitivity index model of disaster-pregnant environment of flood disaster 901, and the second vulnerability index model of disaster-bearing body 902, it can be realized that the model is more inclined to training a model related to a drought disaster when the impact of drought is greater than that of flood, and the model is more inclined to training a model related to a flood disaster when the impact of flood is greater than that of drought, so that the model can adapt to needs of realistic scenarios according to the severity of impact of drought or flood disaster.

Predicting the sensitivity index of disaster-pregnant environment of drought disaster on apples and the vulnerability index of drought disaster on apples in the apple planting region using the machine learning model can achieve a better prediction result, which can further improve accuracy of the comprehensive risk index model of drought disaster.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for assessing comprehensive risk of drought and flood disasters on apples, comprising:
   Step 1: carrying out trend yield simulation using historical apple yield data to calculate an apple yield reduction rate;
   Step 2: calculating a water profit and loss ratio during an apple fruit expansion period using historical weather data;
   Step 3: establishing an optimal relationship curve model between the apple yield reduction rate and the water profit and loss ratio;
   Step 4: determining, according to the optimal relationship curve model, a weather index threshold, and calculating, based on the weather index threshold, the water profit and loss ratio under different apple yield reduction rates to obtain different drought and flood index values corresponding to the different apple yield reduction rates;
   Step 5: calculating, based on an information diffusion theory, risk estimated values corresponding to the different drought and flood index values, which refer to occurrence probabilities of the different drought and flood index values;
   Step 6: calculating, according to the different apple yield reduction rates and the occurrence probabilities of the different drought and flood index values, pure premium rates and actual insurance rates under different thresholds of yield reduction rate;
   Step 7: building, based on risk of a disaster-causing factor, sensitivity of a disaster-pregnant environment, and vulnerability of a disaster-bearing body, a comprehensive risk index model of drought and flood disasters using data of terrain, rivers, vegetation, apple planting area, and the water profit and loss ratio, wherein the comprehensive risk index model of drought and flood disasters includes a comprehensive risk index model of drought disaster and a comprehensive risk index model of flood disaster, wherein the comprehensive risk index model of the drought disaster is built by steps including:

Step 7.11: determining the water profit and loss ratio as a drought disaster index, and classifying the drought disaster index of apples to obtain drought disaster index values of different grades;

Step 7.12: calculating, based on the theory of information diffusion, drought disaster occurrence probabilities corresponding to the drought disaster index values of different grades;

Step 7.13: building, according to the drought disaster occurrence probabilities corresponding to the drought disaster index values of different grades and classification of grades of the drought disaster index, a risk index model of disaster-causing factor of drought disaster on apples to determine a risk index of disaster-causing factor of drought disaster on apples, wherein a size of the risk index of disaster-causing factor of drought disaster is expressed as a sum of products of the drought disaster occurrence probabilities corresponding to the drought disaster index values of different grades and class mid values of drought disasters of different grades;

Step 7.14: building a sensitivity index model of disaster-pregnant environment of drought disaster on apples using terrain information, water system information, and vegetation data of an apple planting region to obtain a sensitivity index of disaster-pregnant environment of drought disaster on apples;

Step 7.15: building a first vulnerability index model of disaster-bearing body using an apple planting area and an agricultural acreage to carry out a disaster-bearing body vulnerability assessment of a drought disaster on apples to obtain a vulnerability index of drought disaster on apples; and Step 7.16: building the comprehensive risk index model of drought disaster on apples using the risk index of disaster-causing factor of drought disaster on apples, the sensitivity index of disaster-pregnant environment of drought disaster on apples, and the vulnerability index of drought disaster on apples;

the comprehensive risk index model of flood disaster is built by steps including:

Step 7.21: determining the water profit and loss ratio as a flood disaster index, and classifying the flood disaster index of apples to obtain flood disaster index values of different grades during the apple fruit expansion period;

Step 7.22: calculating flood disaster occurrence frequencies corresponding to the flood disaster index values of different grades;

Step 7.23: building, according to the flood disaster occurrence frequencies corresponding to the flood disaster index values of different grades and classification of grades of the flood disaster index, a risk index model of disaster-causing factor of flood disaster based on the water profit and loss ratio to determine a risk index of disaster-causing factor of flood disaster based on the water profit and loss ratio, wherein a size of the risk index of disaster-causing factor is expressed as a sum of products of the flood disaster occurrence frequencies corresponding to the flood disaster index values of different grades and class mid values of the flood disasters of different grades;

Step 7.24: building a sensitivity index model of disaster-pregnant environment of flood disaster during the apple fruit expansion period using the data of the terrain information, the water system information, and the vegetation data of the apple planting region to carry out a disaster-pregnant environment sensitivity assessment of a flood disaster on apples to determine a sensitivity index of disaster-pregnant environment of flood disaster on apples;

Step 7.25: building a second vulnerability index model of disaster-bearing body using the apple planting area and the agricultural acreage to carry out a disaster-bearing body vulnerability assessment of a flood disaster during the apple fruit expansion period to determine a vulnerability index of flood disaster on apples; and Step 7.26: building the comprehensive risk index model of flood disaster using the risk index of disaster-causing factor of flood disaster based on the water profit and loss ratio, the sensitivity index of disaster-pregnant environment of flood disaster on apples, and the vulnerability index of flood disaster on apples;

Step 8: designing, according to the comprehensive risk index model of drought disaster and the comprehensive risk index model of flood disaster, a correction coefficient to correct the pure premium rate;

Step 9: calculating, according to the corrected pure premium rate, an actual insurance rate and a premium, wherein the premium is equal to a product of an insured amount and the actual insurance rate; and Step 10: designing a compensation scheme and calculating a compensation pay-outs according to the compensation scheme, wherein the sensitivity index model of disaster-pregnant environment of drought disaster and the first vulnerability index model of disaster-bearing body are machine learning models, and the sensitivity index model of disaster-pregnant environment of drought disaster includes an embedding model and a first prediction model, wherein the embedding model includes:

a first embedding layer, configured to generate a terrain feature vector based on the terrain information;

a second embedding layer, configured to generate a water system feature vector based on the water system information; and a third embedding layer, configured to generate a vegetation feature vector based on the vegetation data;

the first prediction model is configured to predict the sensitivity index of disaster-pregnant environment of drought disaster on apples based on the terrain feature vector, the water system feature vector, and the vegetation feature vector;

the first vulnerability index model of disaster-bearing body is configured to predict the vulnerability index of drought disaster on apples based on planting area information, employee population information, local disaster relief mechanism information, the terrain feature vector, the water system feature vector, and the vegetation feature vector, wherein the planting area information is determined based on the apple planting area and the agricultural acreage, wherein the sensitivity index model of disaster-pregnant environment of drought disaster and the first vulnerability index model of disaster-bearing body are obtained based on a joint training process, comprising:

obtaining a plurality of training samples and labels, wherein the labels include a first label and a second label;

extracting sample terrain information, sample water system information, and sample vegetation data of the training samples based on the first embedding layer, the second embedding layer, and the third embedding layer of an initial sensitivity index model of disaster-pregnant environment of drought disaster respectively, and generating the terrain feature vector, the water system feature vector, and the vegetation feature vector;

inputting the terrain feature vector, the water system feature vector, and the vegetation feature vector into an initial first prediction model, and outputting the sensitivity index of disaster-pregnant environment of drought disaster on apples;

training the initial sensitivity index model of disaster-pregnant environment of drought disaster based on a difference between the output of the initial first prediction model and the first label, and obtaining a trained sensitivity index model of disaster-pregnant environment of drought disaster;

inputting sample planting area information, sample employee population information, sample local disaster relief mechanism information in sample apple planting region of training samples, the terrain feature vector, the water system feature vector, and the vegetation feature vector into an initial first vulnerability index model of disaster-bearing body and outputting the vulnerability index of drought disaster on apples; and training the initial first vulnerability index model of disaster-bearing body based on a difference between the output of the initial first vulnerability index model of disaster-bearing body and the second label, and obtaining a trained first vulnerability index model of disaster-bearing body.

2. The method for assessing comprehensive risk of drought and flood disasters on apples of claim 1, wherein the historical apple yield data includes a historical actual apple yield, the actual apple yield is decomposed into an apple trend yield and an apple meteorological yield, $Yd=Yt+Yw$, the apple meteorological yield is the actual apple yield minus the apple trend yield, $Yw=Yd-Yt$, where Yd denotes the actual apple yield, Yt denotes the apple trend yield, Yw denotes the apple meteorological yield, when $Yw>0$, it means that the apple yield increases due to the weather; when $Yw=0$, it means that the apple yield is not affected by the weather fluctuation; when $Yw<0$, it means that the apple yield is reduced due to the weather; and an apple relative meteorological yield is calculated using the actual apple yield and the apple trend yield, which also refers to an apple yield reduction rate, $Ym=Yw/Yt\times100\%=(Yd-Yt)/Yt\times100\%=(Yd/Yt-1)\times100\%$, where Ym denotes the apple yield reduction rate, which also refers to the apple relative meteorological yield.

3. The method for assessing comprehensive risk of drought and flood disasters on apples of claim 1, wherein in the step 2, a calculation equation of the water profit and loss ratio is $WPLR=(P-ETc)/ETc$, where WPLR denotes the water profit and loss ratio, P denotes precipitation (mm), ETc denotes water demand (mm), $ETc=\Sigma(Kc\times ET_0)$, Kc denotes a crop coefficient corrected using a minimum humidity method recommended by FAO56, and $ET_0$ denotes a crop reference evapotranspiration calculated according to a Penman-Monteith model.

4. The method for assessing comprehensive risk of drought and flood disasters on apples of claim 1, wherein in the step 6, a determination equation of the pure premium rate is $R=E(loss)=\Sigma(P\times loss)$, where R denotes the pure premium rate, loss denotes an apple yield loss, which also refer to the yield reduction rate, E(loss) denotes an expected value of the apple yield loss, P denotes an occurrence probability of flood and drought disasters during the apple fruit expansion period, which is calculated through the step 5, and a determination equation of the actual insurance rate is $Ra=R\times(1+Sf)\times(1+Be)\times(1+Sr)$, where Ra denotes the actual insurance rate, Sf denotes a safety factor, which is taken as 15%, Be denotes business expenses, which is taken as 20%, and Sr denotes a predetermined surrate, which is taken as 5%.

5. The method for assessing comprehensive risk of drought and flood disasters on apples of claim 1, wherein in the step 7.14, the sensitivity index model of disaster-pregnant environment of drought disaster of apples is $DS=ELE*We+RIV*Wr+VEG*Wg$, where DS denotes the sensitivity index of disaster-pregnant environment of drought disaster on apples, ELE, RIV and VEG respectively denote a combined value of elevation and elevation standard deviation, a river network density value, and a normalized value of a normalized vegetation index value, and We, Wr, and Wg denote weights.

6. The method for assessing comprehensive risk of drought and flood disasters on apples of claim 5, wherein in the step 7.15, the first vulnerability index model of disaster-bearing body is $DV=PA/CA\times100$, where DV denotes the vulnerability index of drought disaster on apples, PA denotes the apple planting area, and CA denotes the agricultural acreage.

7. The method for assessing comprehensive risk of drought and flood disasters on apples of claim 6, wherein in the step 7.16, the comprehensive risk index model of drought disaster is $DRI=DH*WH+(1.5-DS)*WS+DV*WV$, where DRI denotes a comprehensive risk index of drought disaster on apples, DH, DS and DV respectively denote the risk index of disaster-causing factor of drought disaster on apples, the sensitivity index of disaster-pregnant environment of drought disaster on apples, and a normalized value of the vulnerability index of drought disaster on apples, and WH, WS, and WV denote weights.

8. The method for assessing comprehensive risk of drought and flood disasters on apples of claim 1, wherein in the step 8, a comprehensive risk index of drought disaster and a comprehensive risk index of flood disaster are first normalized respectively, the normalized comprehensive risk index of drought disaster and the normalized comprehensive risk index of flood disaster are added together, then standardized process is performed according to an equation: correction coefficient=(index value−minimum index value)/(maximum index value−minimum index value)×0.4+0.8, the obtained correction coefficient fluctuates between 0.8 and 1.2 according to a level of drought and flood disaster risk; and corrected pure premium rate=correction coefficient× original pure premium rate.

9. The method for assessing comprehensive risk of drought and flood disasters on apples of claim 1, wherein the sensitivity index model of disaster-pregnant environment of flood disaster is a machine learning model, and the sensitivity index model of disaster-pregnant environment of flood disaster includes an embedding model and a second prediction model, wherein the embedding model includes:
a first embedding layer configured to determine a terrain feature vector based on the terrain information of the apple planting region;
a second embedding layer configured to determine a water system feature vector based on the water system information;

a third embedding layer configured to determine a vegetation feature vector based on the vegetation data; and the second predictive model is configured to determine the sensitivity index of disaster-pregnant environment of flood disaster on apples based on the terrain feature vector, the water system feature vector, and the vegetation feature vector.

10. The method for assessing comprehensive risk of drought and flood disasters on apples of claim 9, wherein the second vulnerability index model of disaster-bearing body is a machine learning model, and the second vulnerability index model of disaster-bearing body is further configured to determine the disaster-bearing body vulnerability index of flood disaster on apples based on the planting area information, the employee population information, the local disaster relief mechanism information, the terrain feature vector, the water system feature vector, and the vegetation feature vector; and the planting area information is determined based on the apple planting area and the agricultural acreage.

* * * * *